US007978862B2

(12) United States Patent
Betts

(10) Patent No.: US 7,978,862 B2
(45) Date of Patent: Jul. 12, 2011

(54) METHOD AND APPARATUS FOR AUDIO SIGNAL PROCESSING

(75) Inventor: David Anthony Betts, Cambridge (GB)

(73) Assignee: Cedar Audio Limited, Cambridge (GB)

( * ) Notice: Subject to any disclaimer, the term of this patent is extended or adjusted under 35 U.S.C. 154(b) by 305 days.

(21) Appl. No.: 10/503,204

(22) PCT Filed: Feb. 3, 2003

(86) PCT No.: PCT/GB03/00440

§ 371 (c)(1),
(2), (4) Date: Jul. 30, 2004

(87) PCT Pub. No.: WO03/065361

PCT Pub. Date: Aug. 7, 2003

(65) Prior Publication Data

US 2005/0123150 A1 Jun. 9, 2005

(30) Foreign Application Priority Data

Feb. 1, 2002 (GB) .................................. 0202386.9

(51) Int. Cl.
*H04B 15/00* (2006.01)

(52) U.S. Cl. ........................................ 381/94.4; 700/94

(58) Field of Classification Search ........ 381/94.1–94.4, 381/119; 700/94; 84/621, 683, 661, 600–602; 386/100, 113, 114

See application file for complete search history.

(56) References Cited

U.S. PATENT DOCUMENTS

| | | | | |
|---|---|---|---|---|
| 4,472,747 | A * | 9/1984 | Schwartz | 360/32 |
| 5,278,943 | A * | 1/1994 | Gasper et al. | 704/200 |
| 5,381,512 | A * | 1/1995 | Holton et al. | 704/200.1 |
| 5,572,443 | A * | 11/1996 | Emoto et al. | 702/103 |
| 6,449,519 | B1 * | 9/2002 | Kuwaoka | 700/94 |
| 6,690,805 | B1 * | 2/2004 | Tsuji et al. | 381/94.1 |
| 6,704,711 | B2 * | 3/2004 | Gustafsson et al. | 704/258 |
| 6,993,309 | B2 * | 1/2006 | Tsujishita et al. | 455/296 |
| 7,171,007 | B2 * | 1/2007 | Rajan | 381/92 |
| 7,181,021 | B2 * | 2/2007 | Raptopoulos et al. | 381/71.14 |

FOREIGN PATENT DOCUMENTS

| | | | |
|---|---|---|---|
| EP | 0 336 685 | A2 | 10/1989 |
| EP | 0 766 247 | A2 | 4/1997 |
| EP | 0 973 269 | A2 | 1/2000 |
| WO | WO 00/38180 | A1 | 6/2000 |

OTHER PUBLICATIONS

S.J. Godsill and Rayner, P.J.W. "Frequency-Based Interpolation of Sampled Signals with Applications in Audio Restoraton" *IEEE*, 1993, pp. I-209-I-212.

Rayner, P.J.W. and S.J. Godsill "The Detection and Correction of Artefacts in Degraded Gramophone Recordings", Proc. IEEE Workshop on Audio and Acoustics, Mohonk, NY, Oct. 1991.

* cited by examiner

*Primary Examiner* — Vivian Chin
*Assistant Examiner* — Lun-See Lao
(74) *Attorney, Agent, or Firm* — Saliwanchik Lloyd & Eisenschenk

(57) ABSTRACT

A sampled digital audio signal is displayed on a spectrogram, in terms of frequency vs. time. An unwanted noise in the signal is visible in the spectrogram and the portion of the signal containing the unwanted noise can be selected using time and frequency constraints. An estimate for the signal within the selected portion is then interpolated on the basis of desired portions of the signal outside the time constraints defining the selected portion. The interpolated estimate can then be used to attenuate or remove the unwanted sound.

26 Claims, 22 Drawing Sheets

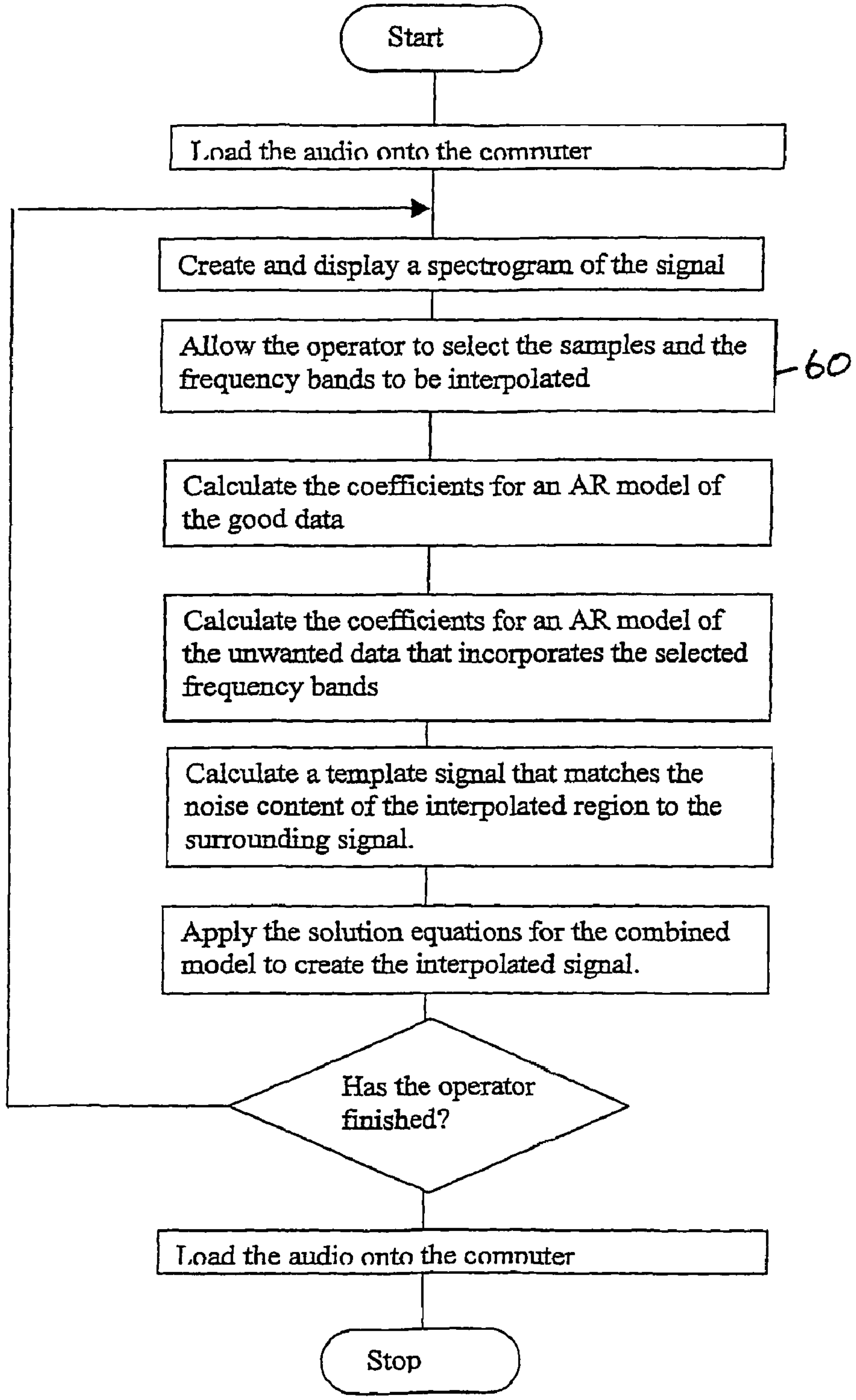
Figure 16: overall procedure

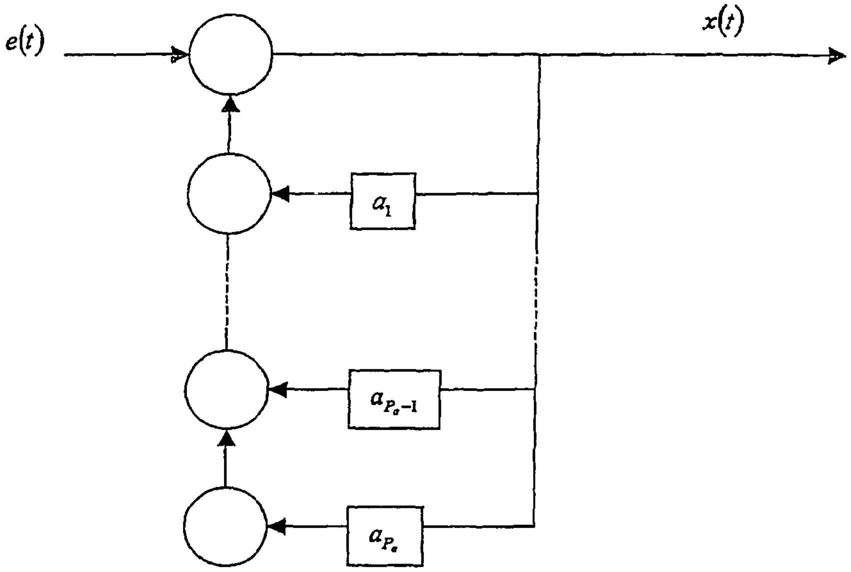
Figure 17: an AR model
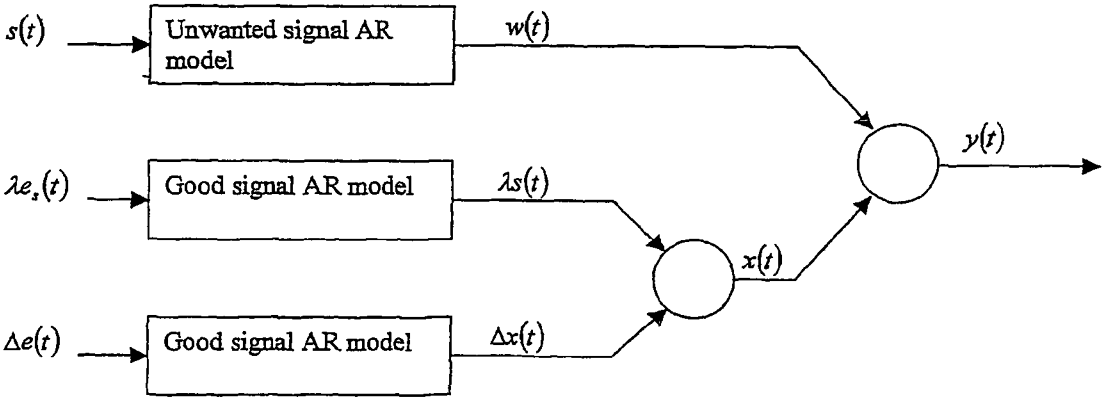
Figure 18: The combined model (FIGURE 5.2. Original (uncorrupted) audio extract)

(FIGURE 5.3. Audio extract with missing sections (shown as zero amplitude))

(FIGURE 5.4. Sin+AR interpolated audio: dotted line - true original; solid line - interpolated)

(FIGURE 5.5. AR interpolated audio: dotted line - true original; solid line - interpolated)

(FIGURE 5.6. Comparison of both methods)

METHOD AND APPARATUS FOR AUDIO SIGNAL PROCESSING

This application is the U.S. national stage application of International patent application no. PCT/GB03/00440, filed Feb. 3, 2003.

FIELD OF INVENTION

This invention concerns methods and apparatus for the attenuation or removal of unwanted sounds from recorded audio signals.

BACKGROUND TO THE INVENTION

The introduction of unwanted sounds is a common problem encountered in audio recordings. These unwanted sounds may occur acoustically at the time of the recording, or be introduced by subsequent signal corruption. Examples of acoustic unwanted sounds include the drone of an air conditioning unit, the sound of an object striking or being struck, coughs, and traffic noise. Examples of subsequent signal corruption include electronically induced lighting buzz, clicks caused by lost or corrupt samples in digital recordings, tape hiss, and the clicks and crackle endemic to recordings on disc.

Current audio restoration techniques include methods for the attenuation or removal of continuous sounds such as tape hiss and lighting buzz, and methods for the attenuation or removal of short duration impulsive disturbances such as record clicks and digital clicks. A detailed exposition of hiss reduction and click removal techniques can be found in the book ‘Digital Audio Restoration’ by Simon J. Godsill and Peter J. W. Rayner, which in its entirety is incorporated herein by reference.

SUMMARY OF THE INVENTION

The invention in its various aspects provides a method and apparatus as defined in the appended independent claims.

Preferred or advantageous features of the invention are set out in dependent sub-claims.

In one aspect, the invention advantageously concerns itself with attenuating or eliminating the class of sounds that are neither continuous nor impulsive (i.e. of very short duration, such as 0.1 ms or less), and which current techniques cannot address. They are characterised by being localised both in time and infrequency. Preferably, the invention is applicable to attenuating or eliminating unwanted sounds of duration between 10 s and 1 ms, and particularly preferably between 2 s and 10 ms, or between 1 s and 100 ms.

Examples of such sounds include coughs, squeaky chairs, car horns, the sounds of page turns, the creaks of a piano pedal, the sounds of an object striking or being struck, short duration noise bursts (often heard on vintage disc recordings), acoustic anomalies caused by degradation to optical soundtracks, and magnetic tape drop-outs.

In a further aspect, the invention provides a method to perform interpolations that, in addition to being constrained to act upon a limited set of samples (constrained in time), are also constrained to act only upon one or more selected frequency bands, allowing the interpolated region within the band or bands to be attenuated or removed seamlessly and without adversely affecting the audio content outside of the selected band or bands.

Furthermore, standard interpolation techniques do not interpolate the noise content of the signal well. Methods exist that attempt to overcome this limitation, but they use a flawed assumption. A preferred embodiment of the invention thus provides an improved method for regenerating the noise content of the interpolated signal, for example by means of a template signal as described below. This, combined with the frequency band constraints, creates a powerful interpolation method that extends significantly the class of problems to which interpolation techniques can be applied.

In the preferred embodiment of the invention, a time/frequency spectrogram is provided. This is an invaluable aid in selecting the time constraints and the frequency bands for the interpolation, for example by specifying start and finish times and upper and lower frequency values which define a rectangle surrounding the unwanted sound or noise in the spectrogram. The methods of the invention may also advantageously apply to other time and/or frequency constraints, for example using variable time and/or frequency constraints which define portions of a spectrogram which are not rectangular.

In a preferred embodiment of the invention, the constrained region does not have to contain one simple frequency band; it can comprise several bands if necessary. In addition, it is not necessary for the unwanted signal samples to be contiguous in time; they can occupy several unadjoining regions. This is advantageous because successive interpolations of simple regions, which may be required to treat unwanted signal samples which are, for example, in the same or overlapping frequency bands and separated only by short time intervals, may give sub-optimal results due to dependencies built up between the interpolations. A single application of this embodiment of the invention may advantageously avoid this build up of dependencies by interpolating all the regions simultaneously.

In a preferred embodiment of the interpolation method of the invention, time and frequency constraints are selected which define a region of the audio recording containing the unwanted sound or noise (in which the unwanted signal is superimposed on the portion of the desired audio recording within the selected region) and which exclude the surrounding portion of the desired audio recording (the good signal). A mathematical model is then derived which describes the good data surrounding the unwanted signal. A second mathematical model is derived which describes the unwanted signal. This second model is constrained to have zero values outside the selected temporal region (outside the selected time constraints) Each of the models incorporates an independent excitation signal. The observed signal can be treated as the sum of the good signal plus the unwanted signal, with the good signal and the unwanted signal having unknown values in the selected temporal region. This can be expressed as a set of equations that can be solved analytically to find an interpolated estimate of the unknown good signal (within the selected region) that minimises the sum of the powers of the excitation signals.

In this embodiment of the invention, the relationship between the two models determines how much interpolation is applied at each frequency. By giving the model for the unwanted signal a spectrally-banded structure that follows the one or more selected frequency bands, this embodiment constrains the interpolation to affect the bands without adversely affecting the surrounding audio (subject to frequency resolution limits). A user parameter varies the relative intensities of the models in the bands, thus controlling how much interpolation is performed within the bands.

The preferred mathematical model to use in this embodiment is an autoregressive or “AR” model. However, an “AR” model plus “basis vector” model may also be used for either model (for either signal). These models are described in the book 'Digital Audio Restoration', the relevant pages of which are included below.

Because of the nature of the analytical solutions referred to above, the embodiment in the preceding paragraphs will not interpolate the noise content of the or each selected band or sub-band. The minimised excitation signals do not necessarily form 'typical' sequences for the models, and this can alter the perceived effect of each interpolation. This deficiency is most noticeable in noisy regions because the uncorrelated nature of noise means that the minimised excitation signal has too little power to be 'typical'. The result of this may be an audible hole in the interpolated signal. This occurs wherever the interpolated signal spectrogram decays to zero due to inadequate excitation.

The conventional method to correct this problem proceeds on the assumption that the excitation signals driving the models are independent Gaussian white noise signals of a known power. The method therefore adds a correcting signal to the excitation signal in order to ensure that it is 'white' and of the correct power. Inherent inaccuracies in the models mean that, in practice, the excitation signals are seldom white. This method may therefore be inadequate in many cases.

A preferred implementation provided in a further aspect of the invention extends the equations for the interpolator to incorporate a template signal for the interpolated region. The solution for these extended equations converges on the template signal (as described below) in the frequency bands where the solution would otherwise have decayed to zero. A user parameter may advantageously be used to scale the temporal signal, adjusting the amount of the template signal that appears in the interpolated solution.

In this implementation, the template signal is calculated to be noise with the same spectral power as the surrounding good signal but with random phase. Analysis shows that this is equivalent to adding a non-white correcting factor to generate a more 'typical' excitation signal.

This eliminates a flaw in existing methods which manifests itself as a loss of energy in the interpolation such that the signal power spectrum decays inappropriately in parts of the interpolated region.

A different implementation could use an arbitrary template signal, in which case the interpolation would in effect replace the frequency bands in the original signal with their equivalent portions from the template signal.

A further, less preferred, embodiment of the invention applies a filter to split the signal into two separate signals: one approximating the signal inside a frequency band or bands (containing the unwanted sounds) and one approximating the signal outside the band or bands. Time and frequency constraints may be selected on a spectrogram in order to specify the portion(s) of the signal containing the unwanted sound, as described above. A conventional unconstrained (in frequency) interpolation can then be performed on the signal containing the unwanted sound(s) (the sub-band frequencies) Subsequently, the two signals can be combined to create a resulting signal that has had the interpolations confined to the band containing the unwanted sound. Ideally, the band-split filter may be of the 'linear phase' variety, which ensures that the two signals can be summed coherently to create the interpolated signal. This method has one significant drawback in that the action of filtering spreads the unwanted sound in time. The time constraints of the interpolator must therefore widen to account for this spread, thereby affecting more of the audio than would otherwise be necessary. The preferred embodiment of the invention, as described previously, includes the frequency constraints as a fundamental part of the interpolation algorithm and therefore avoids this problem.

DESCRIPTION OF A SPECIFIC EMBODIMENT OF THE INVENTION

Specific embodiments of the invention will now be described by way of example with reference to the accompanying drawings, in which;

FIG. 16 is a flow diagram of an embodiment of the invention;

FIG. 17 illustrates an autoregressive model;

FIG. 18 illustrates the combination of models embodying the invention in an interpolator.

Example 1 (referring to FIGS. 1, 2, 3, 4 and 5) shows an embodiment of the invention applied to an unwanted noise, probably a chair being moved, recorded during the decay of a piano note in a 'live' performance. The majority of the unwanted sound is contained in one band, or sub-band, of the spectrum, and it lasts for a duration of approximately 25,000 samples (approximately one half of a second). A single application of the invention removes the unwanted noise without any audible degradation of the wanted piano sound or to the ambient noise.

Figure 1:
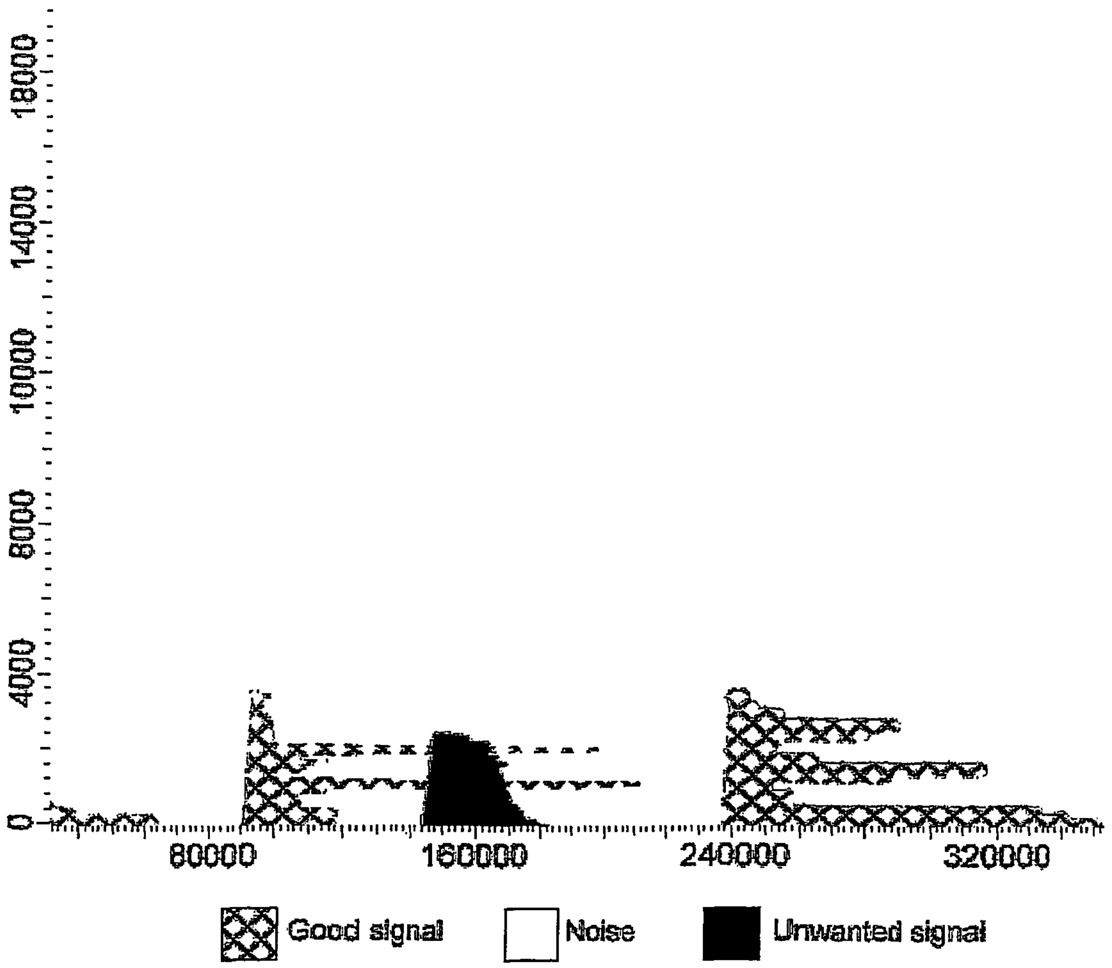
FIG. 1 shows a spectrogram of an audio signal, plotted in terms of frequency vs. time and showing the full frequency range of the recorded audio signal.
Figure 2:
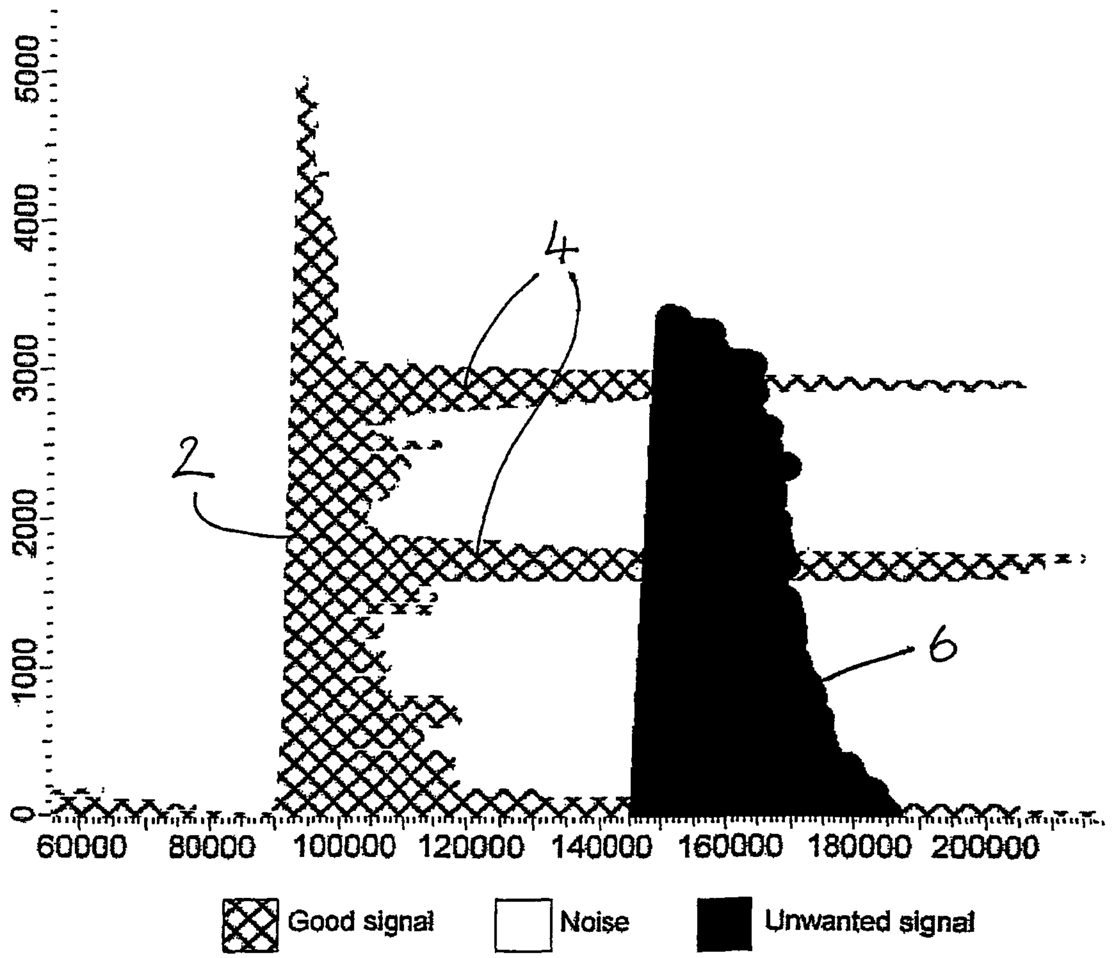
FIG. 2 is an enlarged view of FIG. 1, showing frequencies up to 8000 Hz.

FIG. 1 shows a sample of the full frequency spectrum of the audio recording and FIG. 2 shows an enlarged portion, below about 8000 Hz. The start of the piano note 2 can be seen and, as it decays, only certain harmonics 4 of the note are sustained. The unwanted noise 6 overlies the decaying harmonics.

Figure 3:
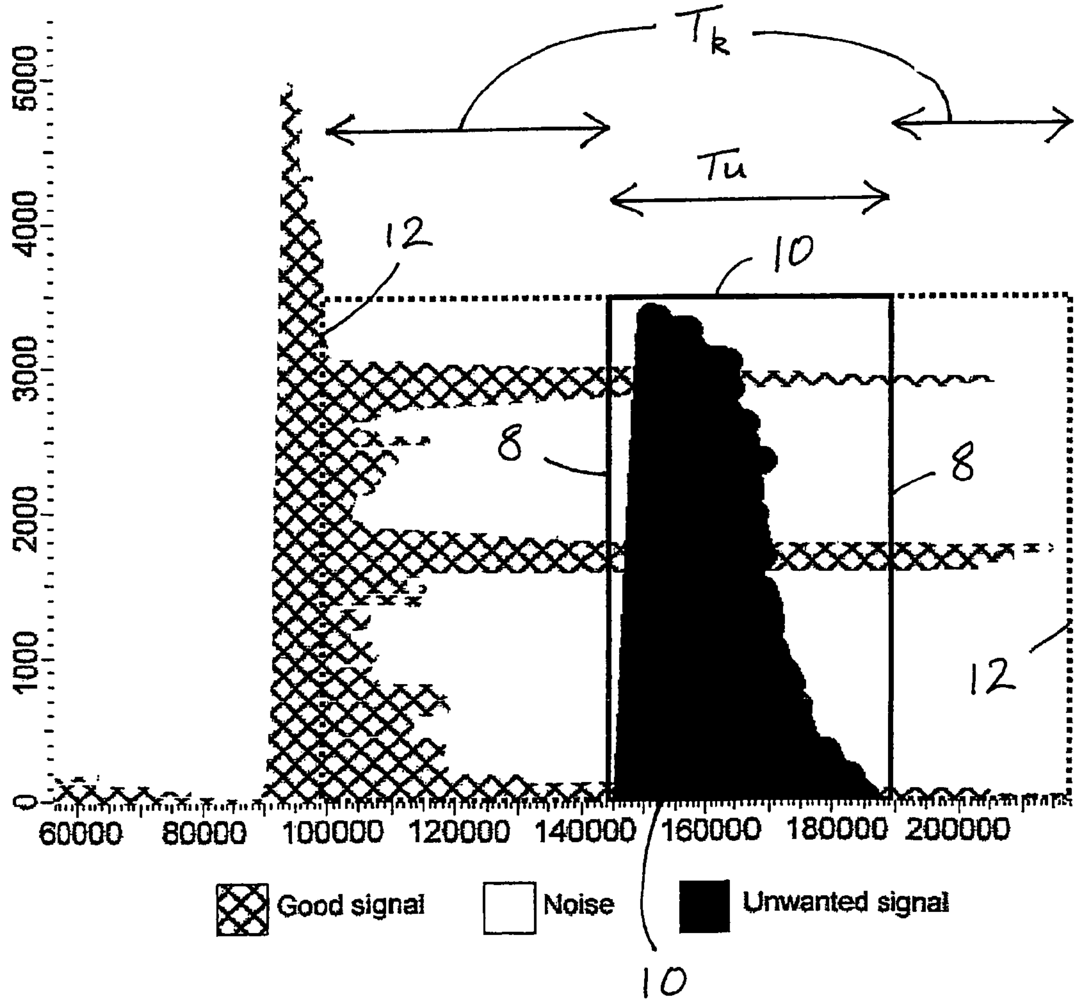
FIG. 3 shows the spectrogram of FIG. 2 with an area selected for unwanted sound removal.

FIG. 3 shows the selection of an area of the spectrogram containing the unwanted sound, the area being defined in terms of selected time and frequency constraints 8, 10.

Figure 4:
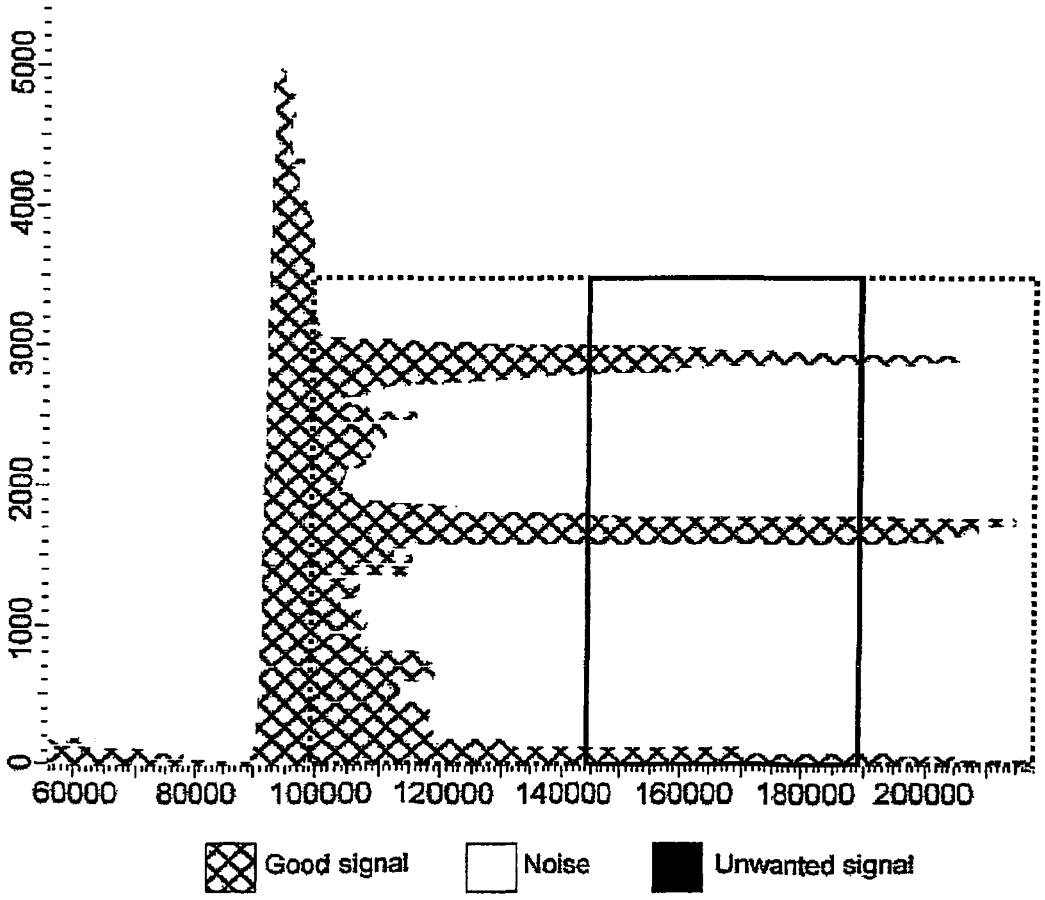
FIG. 4 shows the spectrogram of FIG. 3 after unwanted sound removal.
Figure 5:
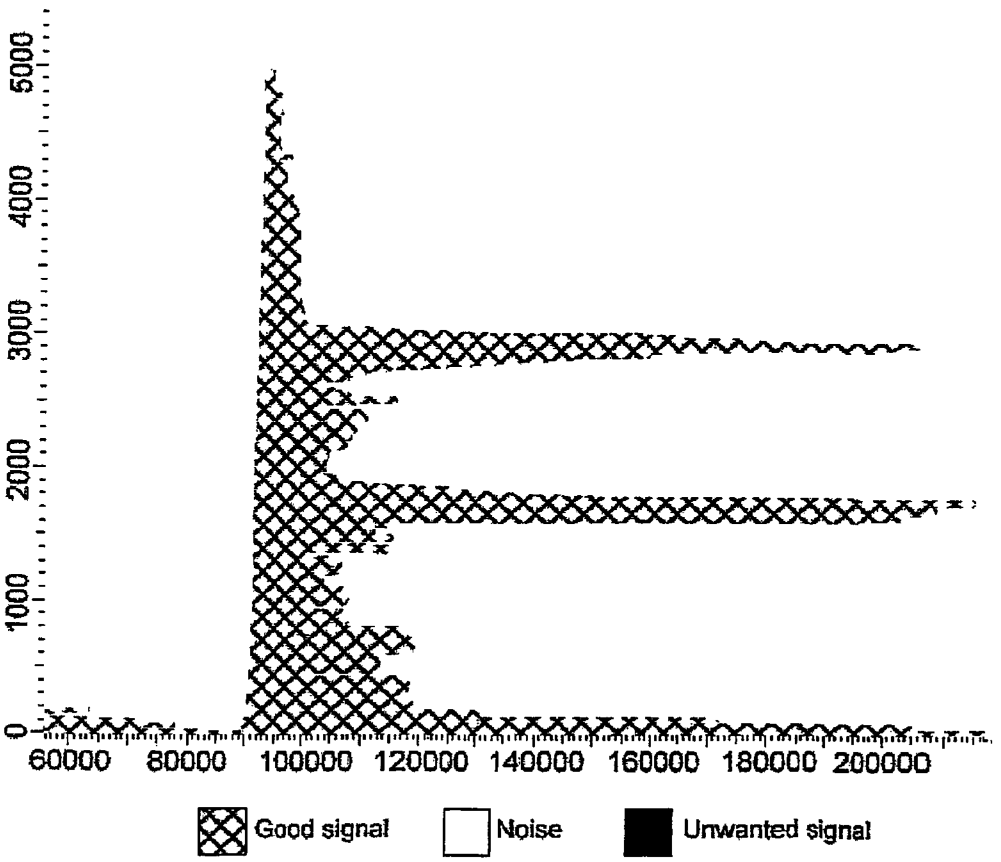
FIG. 5 shows the spectrogram of FIG. 4 after removal of the markings showing the selected area.
Figure 6:
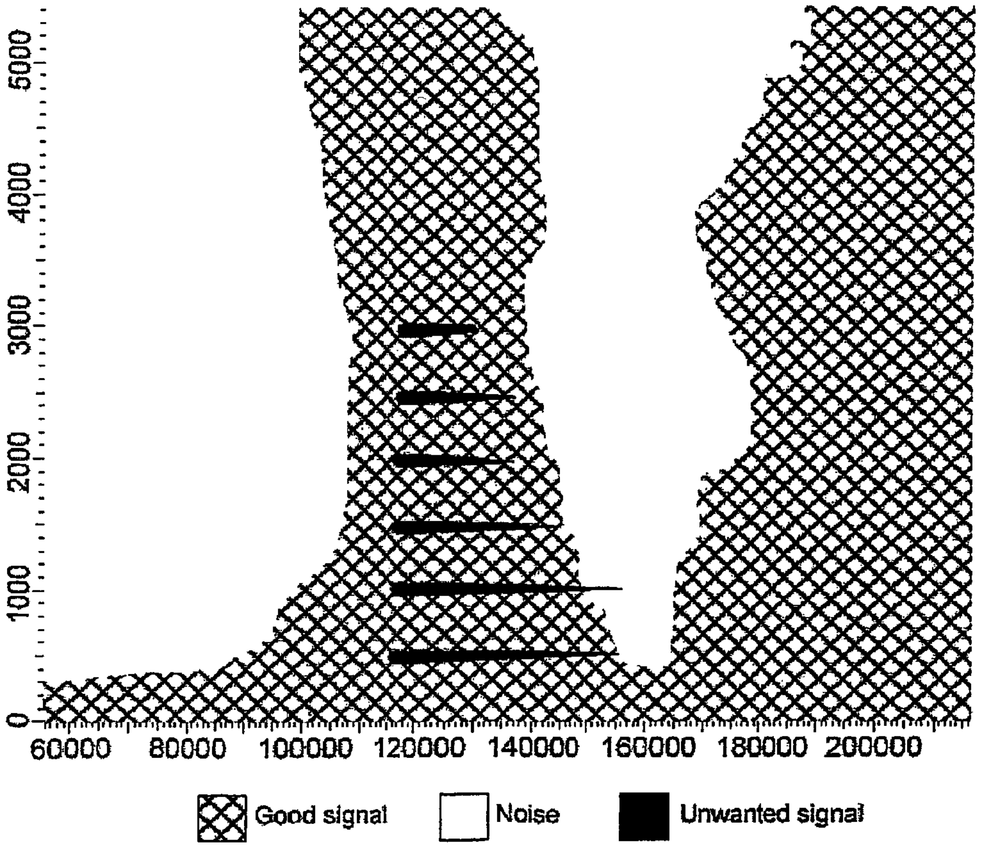
FIGS. 6 to 13 show spectrograms illustrating a second example of unwanted sound removal.
Figure 7:
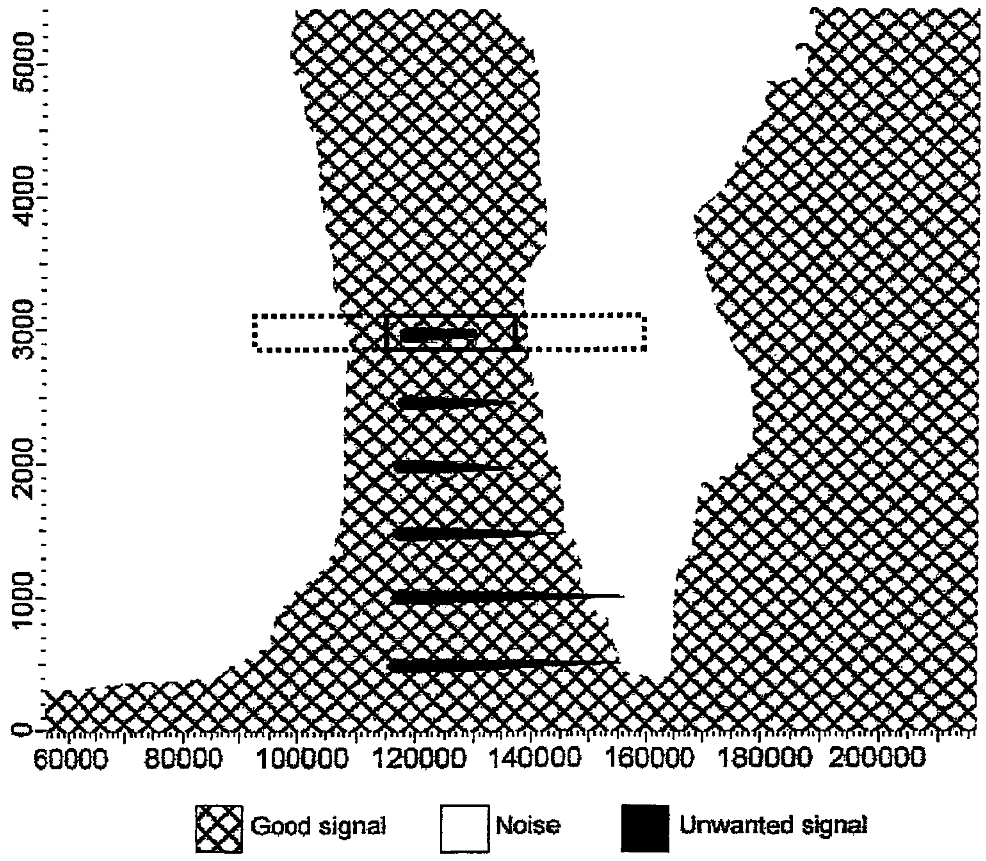
Figure 8:
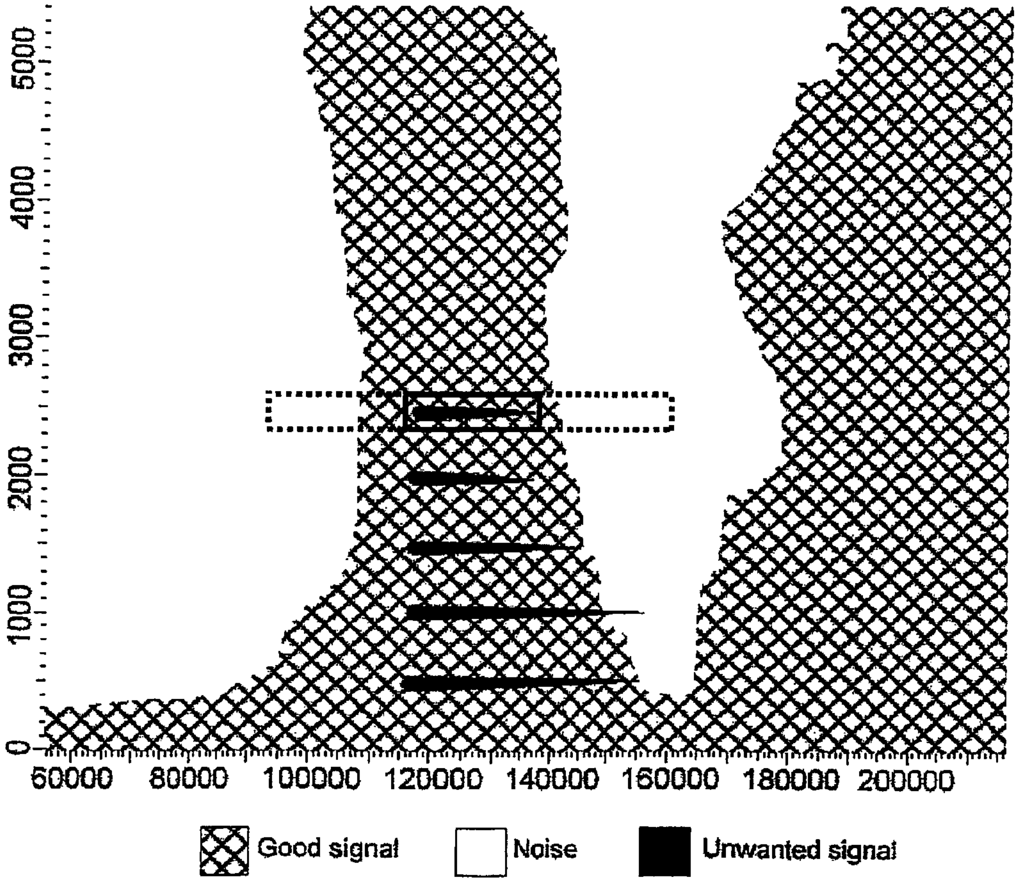
Figure 9:
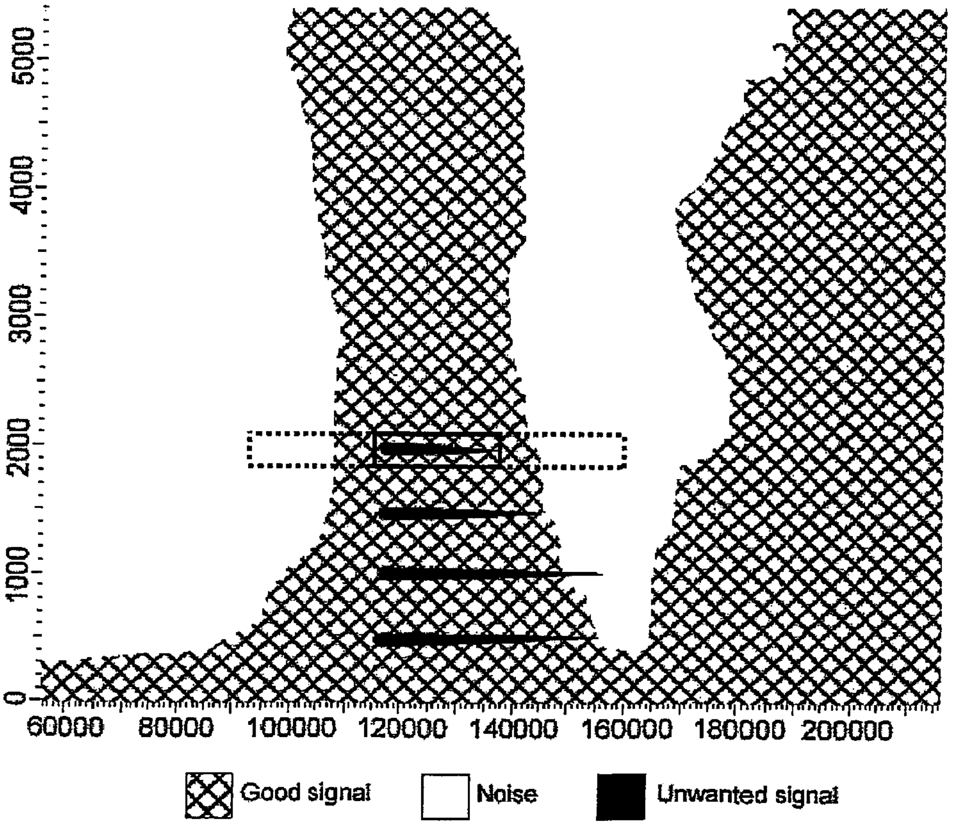
Figure 10:
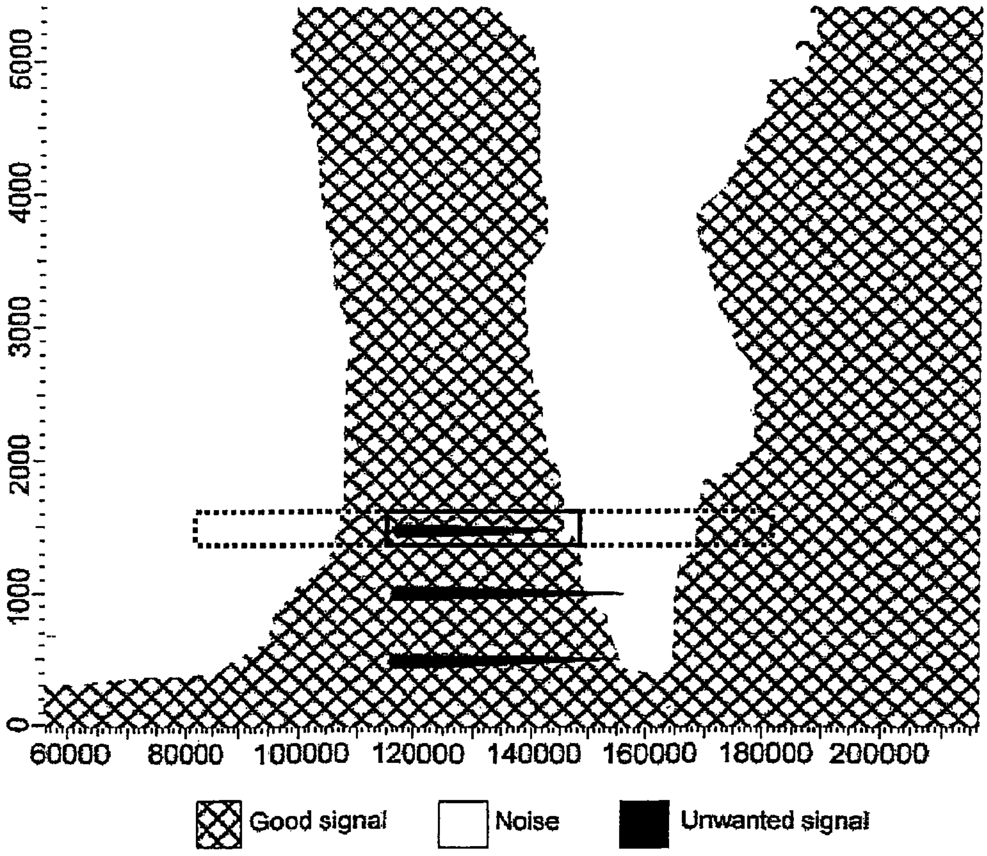
Figure 11:
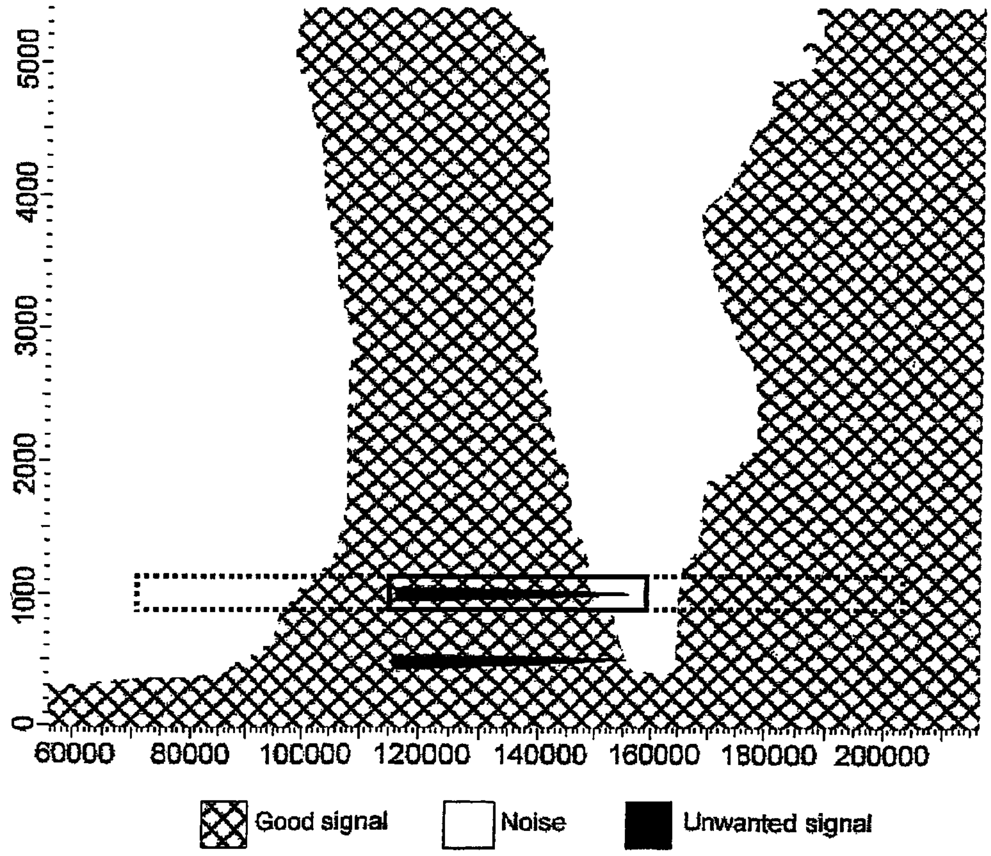
Figure 12:
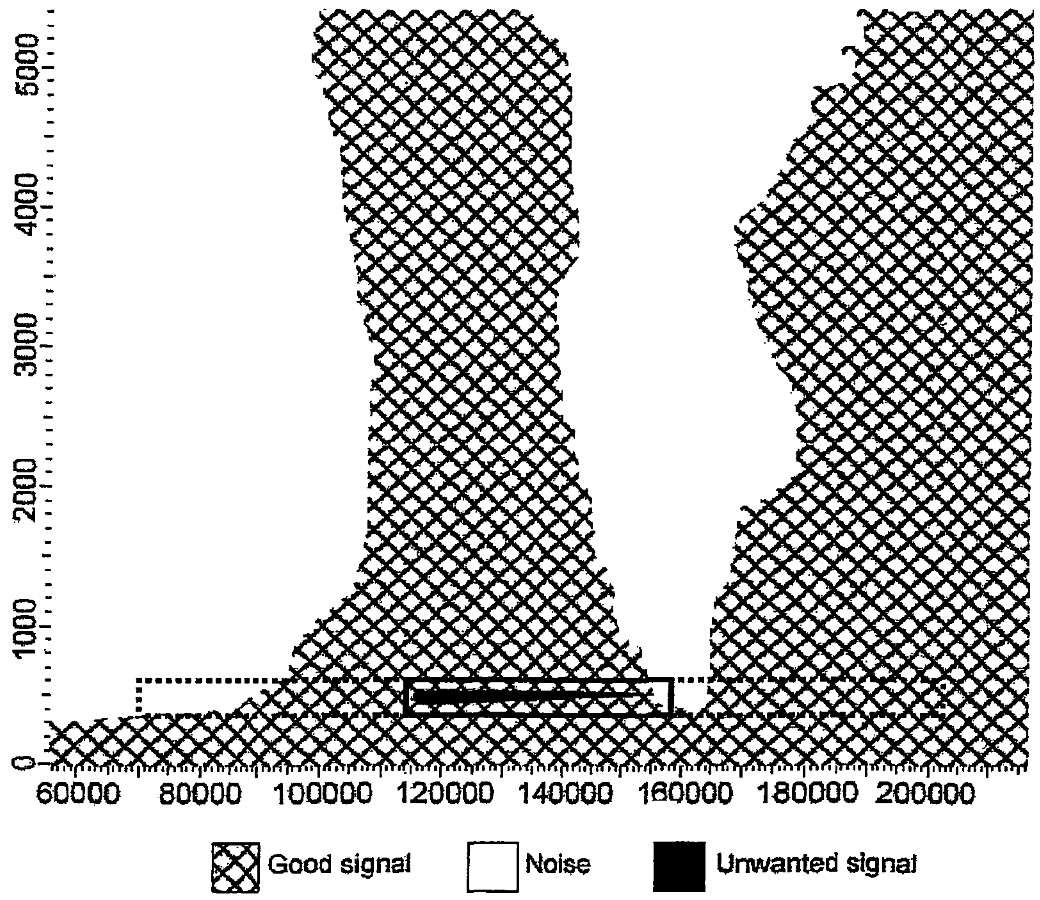
Figure 13:
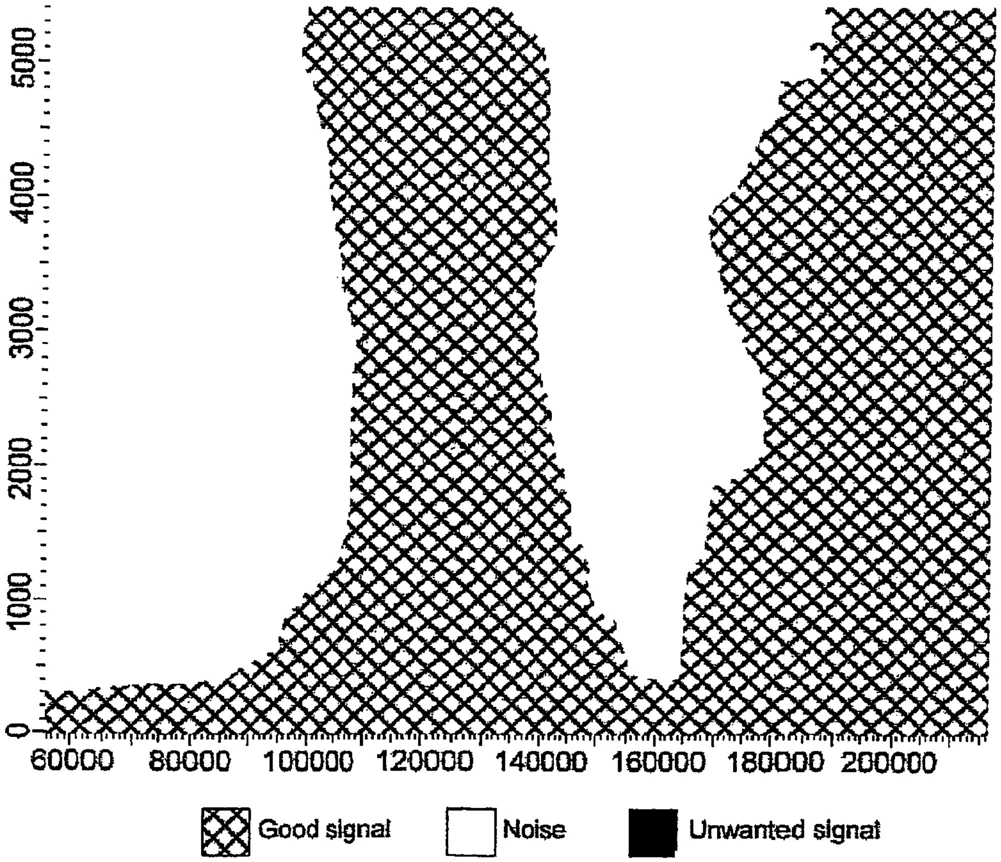

FIG. 3 also shows, as dotted lines, portions of the recorded signal within the selected frequency band but extended in time on either side of the selected area containing the unwanted sound. These areas, extending to selected time limits 12, are used to represent the good signal on which subsequent interpolation is based. FIG. 4 shows the spectrogram of FIG. 3 after interpolation to remove the unwanted sound, as described below. FIG. 5 shows the spectrogram after removal of the rectangles illustrating the time and frequency constraints.

Example 2 (FIGS. 6 to 13) shows an embodiment of the invention applied to the sound of a car horn that sounded and was recorded during the sound of a choir inhaling. The car horn sound is observed as comprising several distinct harmonics, the longest of which has a duration of about 40,000 samples (a little under one second). The sound of the indrawn breath has a strong noise-like characteristic and can be observed on the spectrogram as a general lifting of the noise floor. To eliminate the sound of the horn, each harmonic is marked as a separate sub-band and then replaced with audio that matches the surrounding breathy sound. Once all the harmonics have been marked and replaced, the resulting audio signal contains no audible residue from the car horn, and there is no audible degradation to the breath sound.

FIGS. 6 to 13 illustrate the removal of the unwanted car-horn sound in a series of steps, each using the same principles as the method illustrated in FIGS. 1 to 5. However, the car-horn comprises a number of distinct harmonics at different frequencies, each harmonic being sustained for a different period of time. Each harmonic is therefore removed individually.

Figure 14:
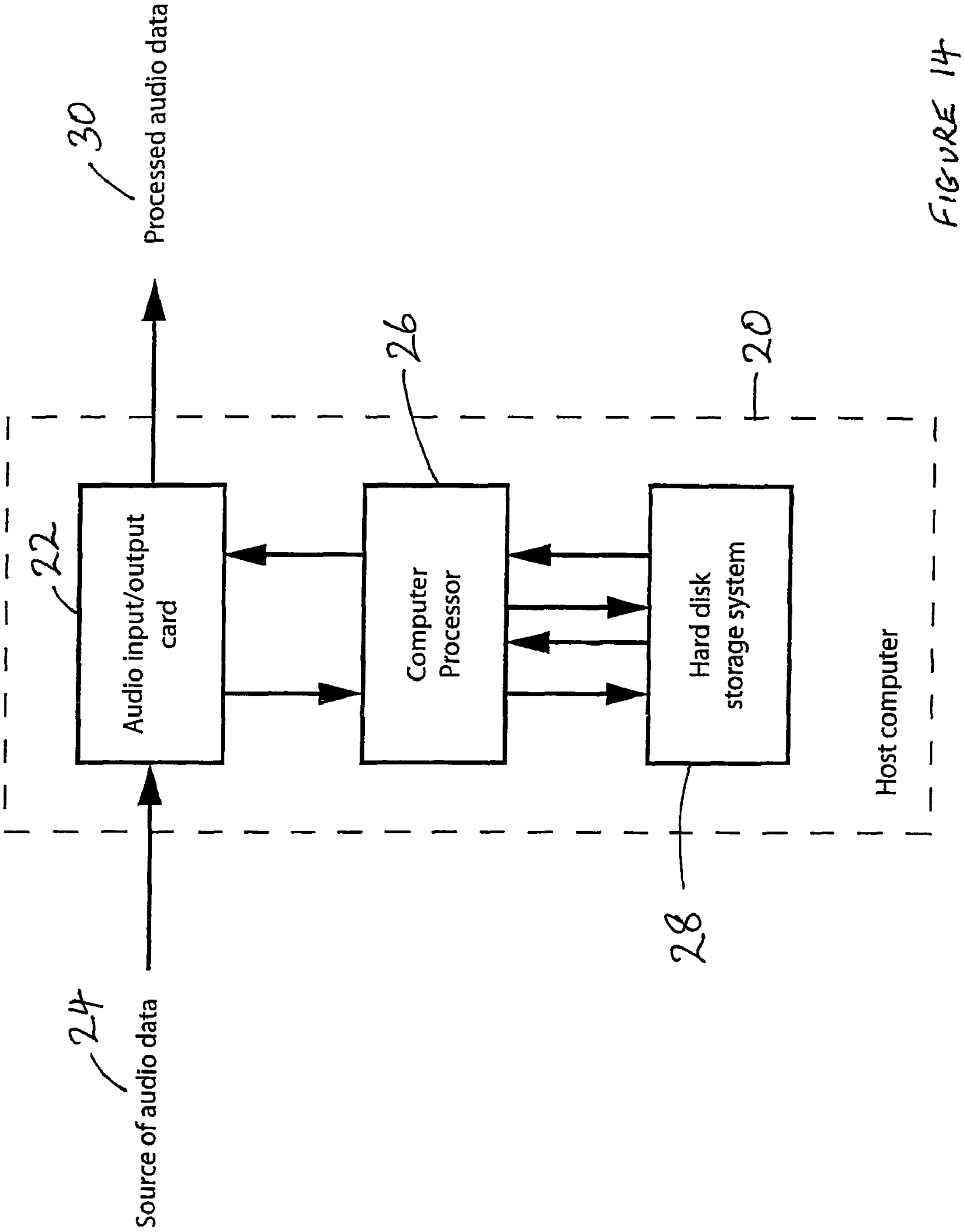
FIG. 14 illustrates a computer system for recording audio.

FIG. 14 illustrates a computer system capable of recording audio, which can be used to capture the samples of the desired digital audio signal into a suitable format computer file. The computer system is implemented on a host computer 20 and comprises an audio input/output card 22 which receives audio data from a source 24. The audio input is passed via a processor 26 to a hard disc storage system 28. The recorded audio can then be output from the storage system via the processor and the audio output card to an output 30, as required.

Figure 15:
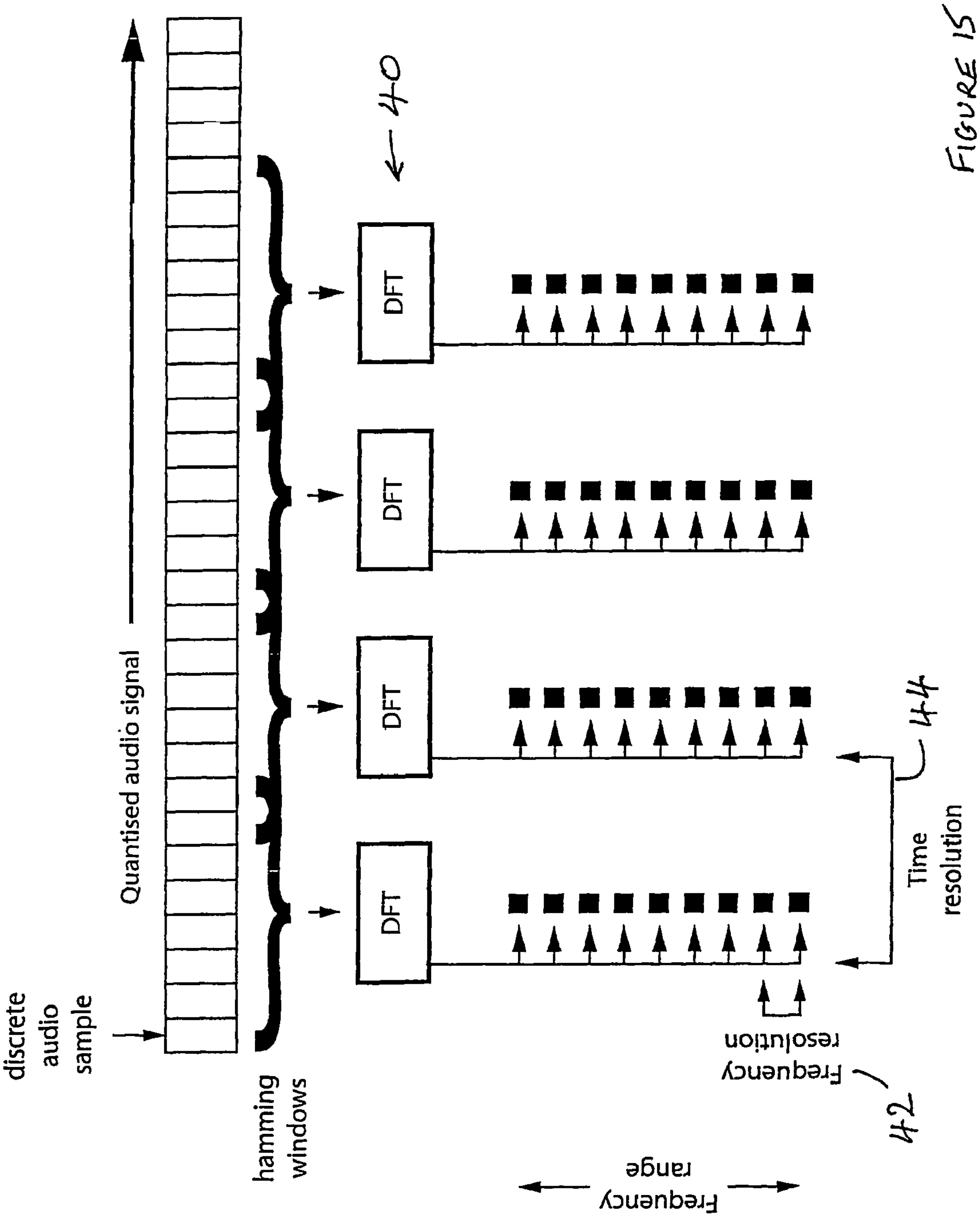
FIG. 15 illustrates the estimation of spectrogram powers using Discrete Fast Fourier transforms.
Figure 19:
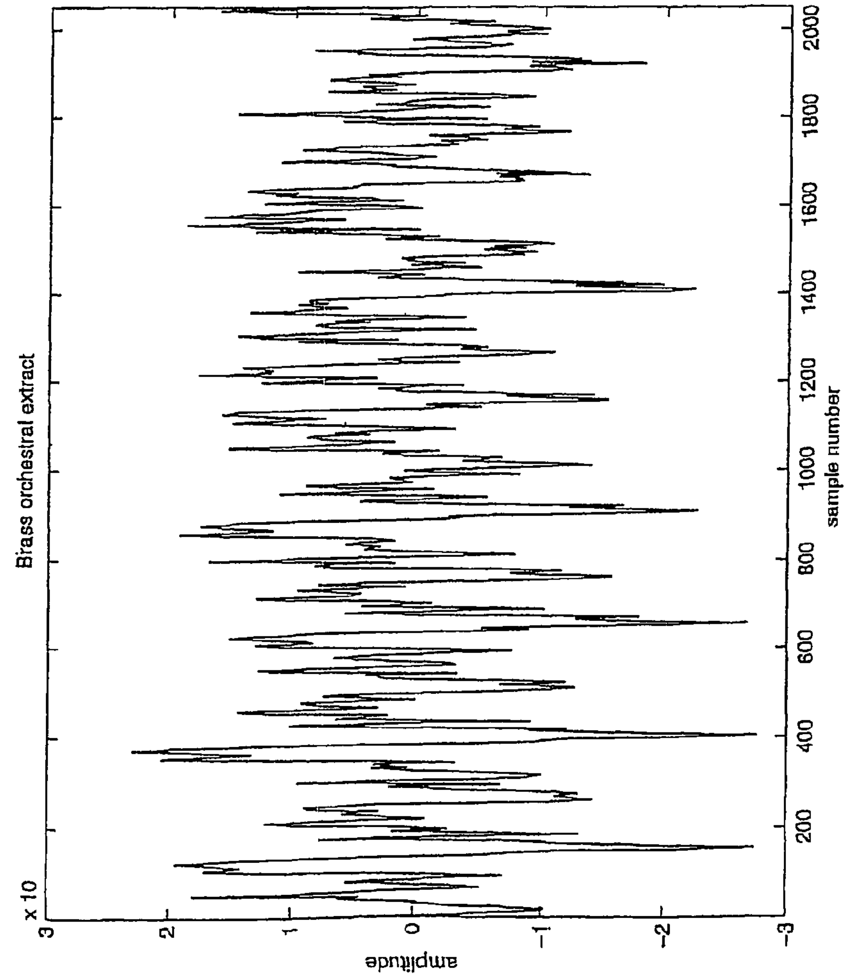
FIGS. 19 to 23 are reproductions of FIGS. 5.2 to 5.6 respectively of the book "Digital Audio Restoration" referred to herein.
Figure 20:
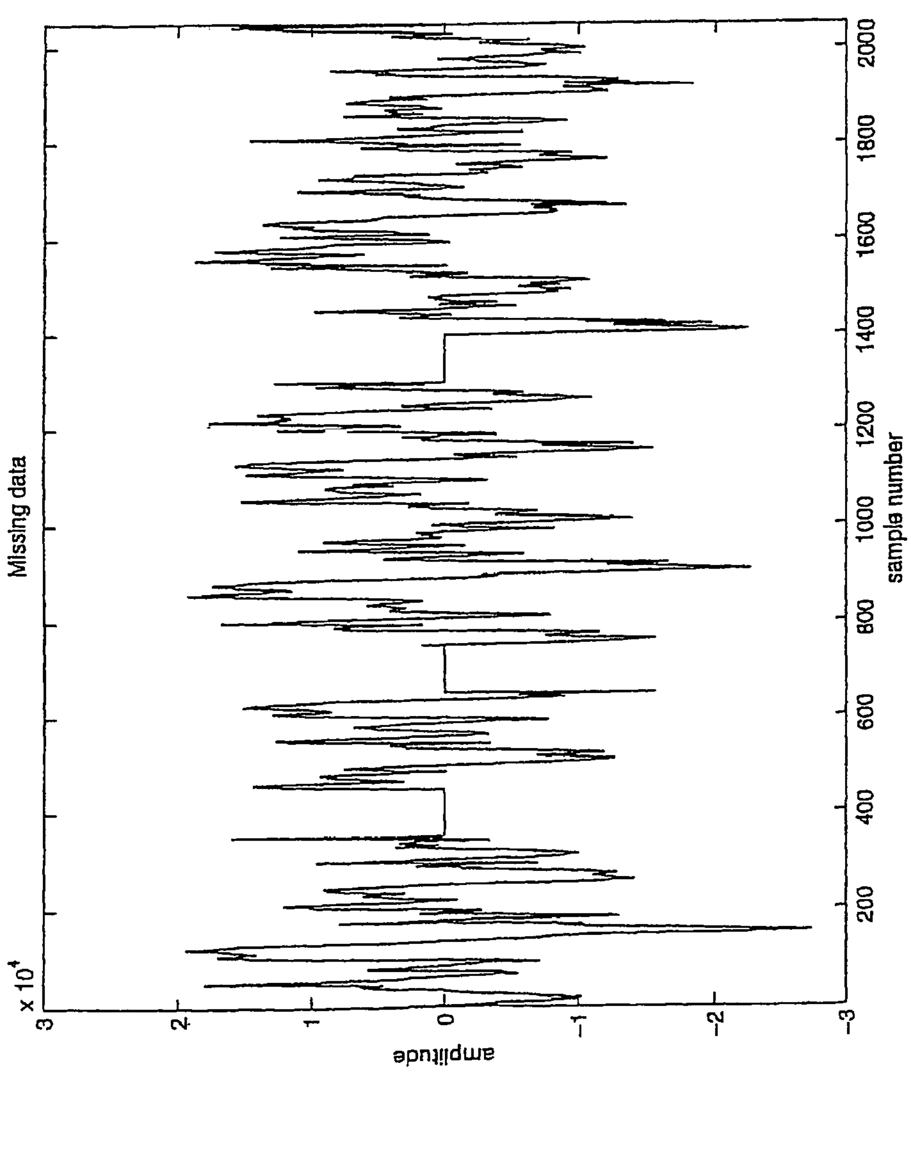
Figure 21:
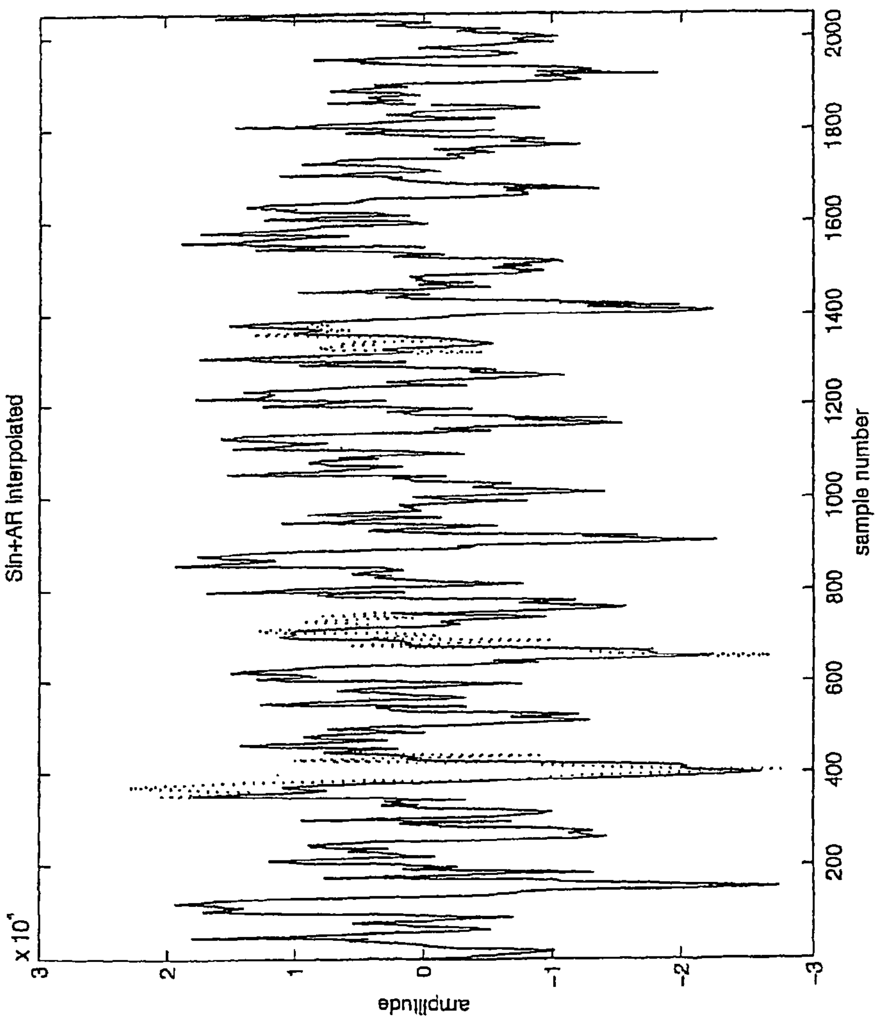
Figure 22:
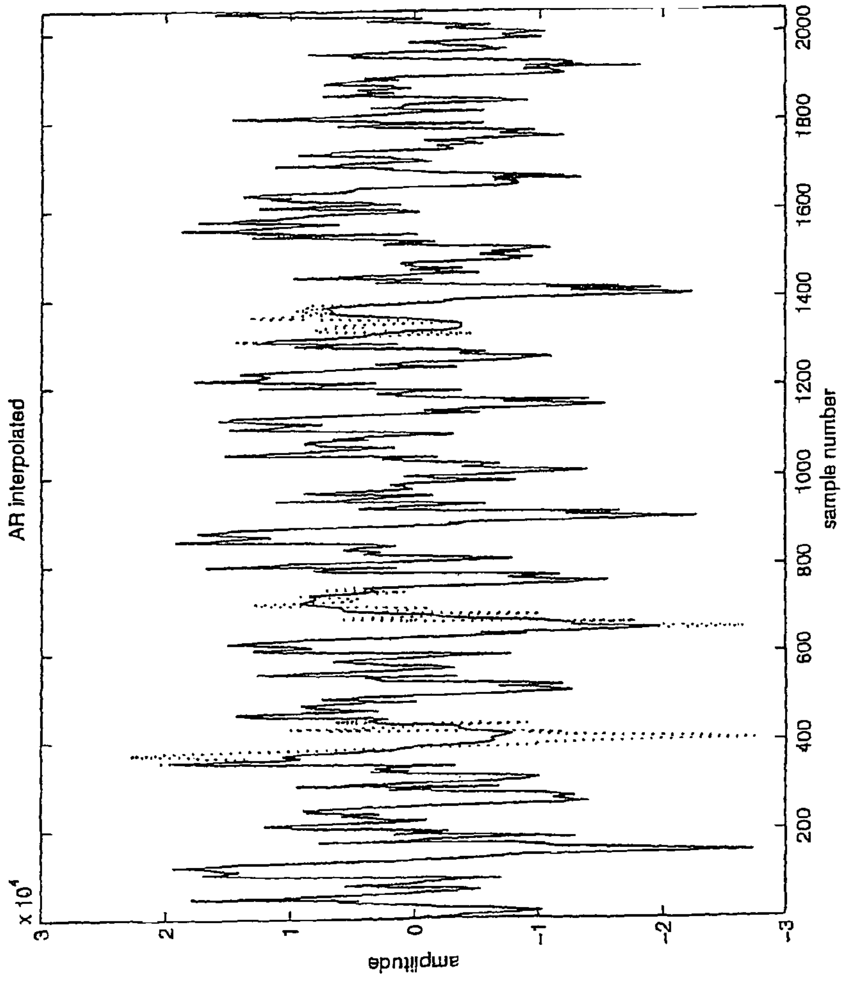
Figure 23:
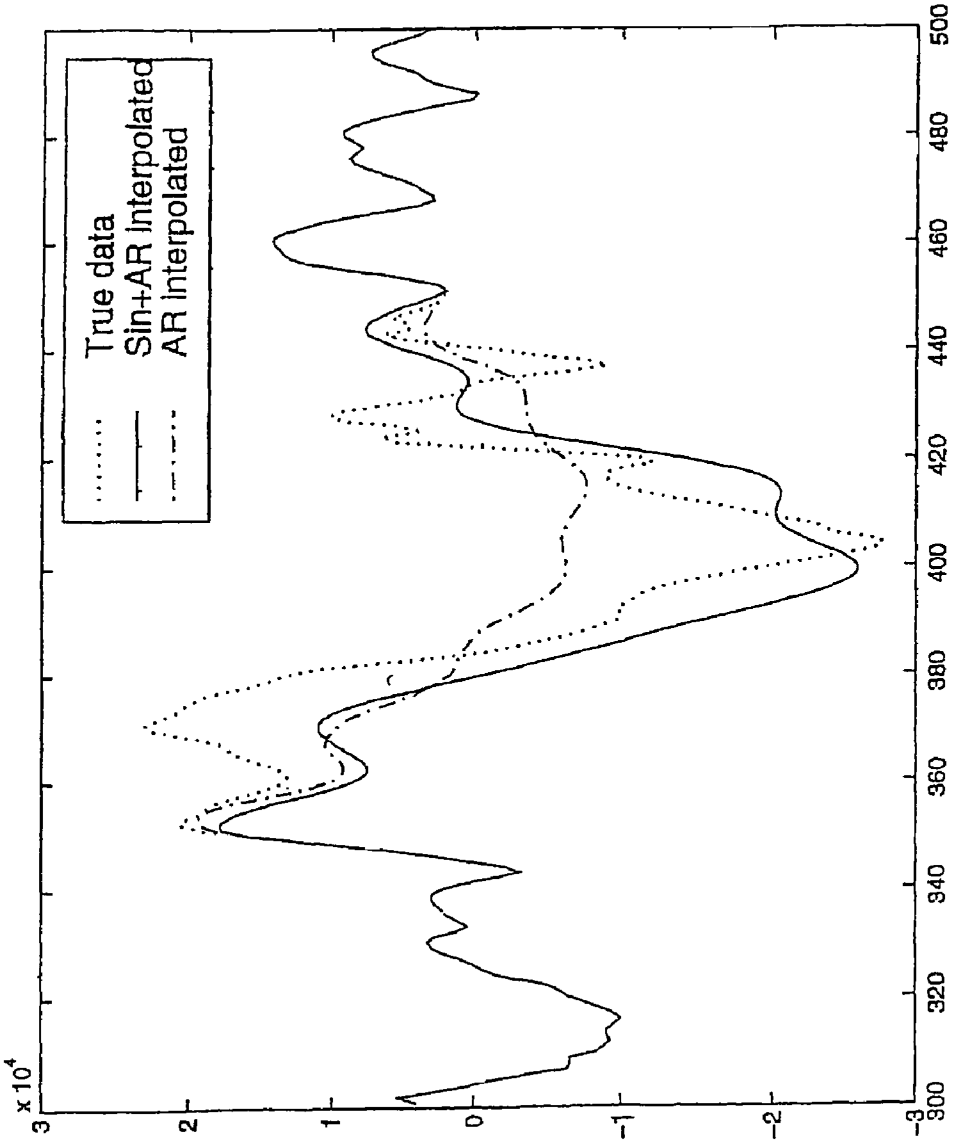

The computer system will then display a time/frequency spectrogram of the audio (as in FIGS. 1 to 13). The time frequency spectrogram displays two dimensional colour images where the horizontal axis of the spectrogram represents time, the vertical axis represents frequency and the colour of each pixel in an image represents the calculated spectral power at the relevant time and frequency. The spectrogram powers can be estimated using successive overlapped windowed Discrete Fast Fourier transforms 40, see FIG. 15. The length of the Discrete Fast Fourier Transform determines the frequency resolution 42 in the vertical axis, and the amount of overlap determines the time resolution 44 in the horizontal axis. The colourisation of the spectrogram powers can be performed by mapping the powers onto a colour lookup table. For example the spectrogram powers can be mapped onto colours of variable hue but constant brightness and saturation. The operator can then graphically select the unwanted signal or part thereof by selecting a region on the spectrogram display.

The following embodiment can either reduce the signal in the selected region or replace it with a signal template synthesised from the surrounding audio. The embodiment has two parameters that determine how much synthesis and reduction are applied.

This method for replacing the signal proceeds as follows:

1. Derive an AR model for the good signal outside the constrained region, using the following steps:
   - Calculate the coefficients of the AR model for the known good signal.
   - Calculate the matrix representation of the AR model and partition it into parts corresponding to the unknown and known parts of the signal.
2. Postulate a signal that is constrained to lie in the selected frequency bands and derive an AR model for the unwanted signal from it, using the following steps:
   - Create a power spectrum that has the value 1.0 in regions where the signal is inside the frequency bands and 0.0 where it lies outside.
   - Calculate the autocorrelation of the unwanted signal from this power spectrum.
   - Calculate the AR model for the unwanted signal, using the autocorrelation derived previously.

- Calculate the matrix representation of the AR model and partition it into parts corresponding to the unknown and known parts of the signal.
3. Calculate a template signal that has a power spectrum that matches the good signal, but that has a randomised phase. Scale this synthetic signal depending on how much synthesis the user has requested. From the synthesised signal and the matrix representation of the good AR model, calculate the synthetic excitation.
4. Estimate the unwanted signal outside the time constraints. In this implementation that estimate is zero.
5. Use the combined equations to calculate an estimate for the unknown data. This estimate will fulfil the requirement that the interpolation is constrained to affect only those frequencies within the selected bands but not affect those outside the selected bands.

The implementation will then redisplay the spectrogram so that the operator can see the effect of the interpolation (FIG. 5).

See below for a more detailed description of the equation used in each stage and diagrams of how they interact.

More Detailed Description Of An Example Implementation Of The Invention

The flow diagram in FIG. 16 Shows the basic steps used in the interpolation of the set of signal samples. Bach of these stages will now be described in more detail.

Model Assumptions

Sample Sets

The operator has selected T contiguous samples 60 from a discrete time signal that have been stored in an array of values y(t), $0 \leqq t < N$. From this region the operator has selected a subset of these samples to be interpolated. We define the set $T_u$ as the subset of $N_u$ sample times selected by the operator for interpolation We define the set $T_k$ as the subset of $N_k$ sample times (within T but outside the subset $T_u$) not selected by the operator. The lengths of the two sets are related such that $N=N_k+N_u$. It is also desirable that there are at least twice as many samples in the set $T_k$ as there are in $T_u$. Furthermore the operator has selected one or more frequency bands within which to apply the interpolation

Observation Model

The signal y(t) is assumed to be formed from the sum of two independent signals, the good signal x(t) and an unwanted signal w(t). Therefore we have the following model for the observations $$y(t)=x(t)+w(t) \tag{1}$$

or, in vector notation $$\underline{y}=\underline{x}+\underline{w} \tag{2}$$

where $$\underline{y}=[y(0) \ldots y(T-1)]^T \tag{3}$$

$$\underline{x}=[x(0) \ldots x(T-1)]^T \tag{4}$$

$$\underline{w}=[w(0) \ldots w(T-1)]^T \tag{5}$$

We can further partition these vectors into those elements corresponding to the set of sample times $T_u$ and those corresponding to the set of sample times $T_k$.

$$\underline{y_u}=\underline{x_u}+\underline{w_u} \tag{6}$$

$$\underline{y_k}=\underline{x_k}+\underline{w_k} \tag{7}$$

where $$\underline{y}_u=[y(t_0)\ldots y(t_{Nu-1})]^T, t_j \in T_u \tag{8}$$

$$\underline{x}_u=[x(t_0)\ldots x(t_{Nu-1})]^T, t_j \in T_u \tag{9}$$

$$\underline{w}_u=[w(t_0)\ldots w(t_{Nu-1})]^T, t_j \in T_u \tag{10}$$

$$\underline{y}_k=[y(t_0)\ldots y(t_{Nk-1})]^T, t_j \in T_k \tag{11}$$

$$\underline{x}_k=[x(t_0)\ldots x(t_{Nk-1})]^T, t_j \in T_k \tag{12}$$

$$\underline{w}_k=[w(t_0)\ldots w(t_{Nk-1})]^T, t_j \in T_k \tag{13}$$

Obviously both $\underline{y}_u$ and $\underline{y}_k$ are known as they form the observed signal values.

We stipulate that the values of x(t) and w(t) must be known a priori for the set of sample times $T_k$. Hence, in the case where the unwanted signal is zero in this region we get $$\underline{w}_k=\underline{0} \tag{14}$$

$$\underline{x}_k=\underline{y}_k \tag{15}$$

We define our interpolation method as estimating the unknown values of $\underline{x}_u$ Deriving the AR Model for the Good Signal The basic form of an AR model is shown in FIG. 17. Mathematically this is expressed for the good signal as $$x(t) = e_x(t) - \sum_{i=1}^{P_a} a_i x(t-i), \quad P_a \le t < N \tag{16}$$

or in its alternate form $$e_x(t) = \sum_{i=0}^{P_a} a_i x(t-i), \qquad a_0 = 1 \tag{17}$$

where

- $P_a$ is the order of the autoregressive model, typically of the order 25.

The autoregressive model is specified by the coefficients $a_1$ $e_x(t)$ defines an excitation sequence hat drives the model.

In this case we have to estimate the coefficients of the model only from the known values of $\underline{x}_k$. It is sufficient for this purpose to create a new vector $x_1(t)$ that assumes the unknown values of x(t) are zero.

$$x_1(t) = \begin{cases} 0, & t \in T_u \\ x(t), & t \in T_k \end{cases} \tag{18}$$

Solving for the AR Coefficients

There are several methods for calculating the model coefficients. This example uses the covariance method as follows:

Equation 16 can now be reformulated into a matrix form as $$\begin{bmatrix} e_x(N-1) \\ \vdots \\ e_x(P_a) \end{bmatrix} = \begin{bmatrix} x_1(N-1) \\ \vdots \\ x_1(P_a) \end{bmatrix} + \begin{bmatrix} x_1(N-1) & \cdots & x_1(N-1-P_a) \\ \vdots & & \vdots \\ x_1(P_a-1) & \cdots & x_1(0) \end{bmatrix} \cdot \begin{bmatrix} a_i \\ \vdots \\ a_p \end{bmatrix} \tag{19}$$

which can be expressed more compactly in the following equation an appropriate definition $\underline{e}_x$, $\underline{x}_1$, $\underline{a}$ and $X_1$ $$\underline{e}_x=\underline{x}_1+X_1\cdot \underline{a} \tag{20}$$

The values of $\underline{a}$ that minimise the excitation energy $$J_x=\underline{e}_x^T\underline{e}_x \tag{21}$$

can be calculated jointly using the formula $$\underline{a}=-(X_1^TX_1)^{-1}X_1^T\underline{x}_1 \tag{22}$$

This minimum value of $J_x$ should also be calculated ($J_{xmin}$) using equations 20 and 21

Expressing the Model in Terms of the Known and Unknown Signal

Having calculated the model coefficients $\underline{a}$, we can use equation 17 to express an alternative matrix representation of the model.

$$\begin{bmatrix} e_x(N-1) \\ \vdots \\ e_x(P_a) \end{bmatrix} = \begin{bmatrix} 1 & a_1 & \cdots & a_{P_a} & 0 & & 0 \\ & & 0 & & \ddots & & 0 \\ & & 0 & & 0 & 1 & a_1 & \cdots & a_{P_a} \end{bmatrix} \cdot \begin{bmatrix} x(N-1) \\ \vdots \\ x(0) \end{bmatrix} \tag{23}$$

which can be expressed more compactly with an appropriate definition of A as $$\underline{e}_x=A\cdot\underline{x}$$

this matrix equation can be partitioned into two parts as $$\underline{e}_x=A_u\underline{x}_u+A_k\underline{x}_k \tag{24}$$

where the matrix $A_u$ is submatrix of A formed by taking the columns of A appropriate to the unknown data $\underline{x}_u$ and the matrix $A_k$ is submatrix of A formed by taking the columns of A appropriate to the known data $\underline{x}_k$.

Deriving the AR Model for the Unwanted Signal

The model for the unwanted signal uses an AR model as in the Good signal model. Mathematically this is expressed as $$w(t) = e_w(t) - \sum_{i=0}^{P_b} b_i w(t-i), \quad P_b \le t < N \tag{25}$$

or in its alternate form $$e_w(t) = \sum_{i=0}^{P_b} b_i w(t-i), \quad b_0 = 1 \tag{26}$$

where

- $P_b$ is the order of the autoregressive model with sufficiently high order to create a model constrained to lie in the selected frequency bands. For very narrow bands this is relatively trivial, but it will require a typically require a model order of several hundred for broader selected bands.

The autoregressive model is specified by the coefficients $b_i$ $e_w(t)$ defines an excitation sequence that drives the model Solving for the AR Coefficients The difficulty is in finding a model that adequately expresses the frequency constraints. One method is to create a hypothetical artificial waveform with the required band limited structure and then solve the model equations for this artificial waveform Let this artificial waveform be w'(t). We can get a solution for the model coefficients purely by knowing the correlation function of this waveform:

$$r_{ww}(\tau)=E\{w'(t)w'(t-\tau)\} \quad (27)$$

Create an artificial power spectrum $W'(\overline{w})$ which has an amplitude of 1.0 inside the frequency bands and zero outside it. Talking the inverse Discrete Fourier Transform of this power spectrum will give a suitable estimate for $r_{ww}(\tau)$ The filter coefficients can be found by the following equation $$\begin{bmatrix} b_1 \\ \vdots \\ b_{P_b} \end{bmatrix} = -\begin{bmatrix} r_{ww}(0) & & r_{ww}(1-P_b) \\ & \ddots & \\ r_{ww}(P_b-1) & & r_{ww}(0) \end{bmatrix} \cdot \begin{bmatrix} r_{ww}(1) \\ \vdots \\ r_{ww}(P_b) \end{bmatrix} \quad (28)$$

Furthermore the excitation power required for this artificial model can be calculated as:

$$J_{wmin} = r_{ww}(0) - \begin{bmatrix} b_1 \\ \vdots \\ b_{P_b} \end{bmatrix}^T \begin{bmatrix} r_{ww}(1) \\ \vdots \\ r_{ww}(P_b) \end{bmatrix} \quad (29)$$

Expressing the Model in Terms of the Known and Unknown Signal

Having calculated the model coefficients $\underline{b}$, we can use equation 26 to express an alternative matrix representation of the model.

$$\begin{bmatrix} e_w(N-1) \\ \vdots \\ e_w(P_b) \end{bmatrix} = \begin{bmatrix} 1 & b_1 & \cdots & b_{P_b} & 0 & & & & 0 \\ & & & 0 & \ddots & & & & 0 \\ & & & 0 & & 0 & 1 & b_1 & \cdots & b_{P_b-1} \end{bmatrix} \cdot \begin{bmatrix} w(N-1) \\ \vdots \\ w(0) \end{bmatrix} \quad (30)$$

which can be expressed more compactly with al appropriate definition of B as $$\underline{e}_w = B \cdot w$$

this matrix equation can be partitioned into two parts as $$\underline{e}_w = B_u \cdot \underline{w}_u + B_k \underline{w}_k \quad (31)$$

with suitable definitions of $B_k$ and $B_u$

We now use equation 1 to express equation 33 in terms of $\underline{y}$ and $\underline{x}$ $$\underline{e}_w = B_u \cdot (\underline{y}_u - \underline{x}_u) + B_k \cdot (\underline{y}_k - \underline{x}_k) \quad (32)$$

In the case where $\underline{w}_k=0$ this collapses to $$\underline{e}_w = B_u \cdot (\underline{y}_u - \underline{x}_u) \quad (33)$$

The Template signal

We calculate the template signal s from the known good data $x_k$ as follows. We calculate the Discrete Fourier Transform $X_1(\overline{w})$ of the waveform $x_1(t)$ defined in equation 18. We then create a synthetic spectrum $S_1(\overline{w})$ that has the same amplitude as $X_1(\overline{w})$ but uses pseudo-random phases. This spectrum is then inverted using the inverse Discrete Fourier Transform to give the template signal s. This has to be subsequently filtered by the good signal model to give a template excitation $\underline{e}_s$ as follows:

$$\underline{e}_s = A\underline{s}$$

We hypothesise a new signal $$\Delta\underline{x} = \underline{x} - \Delta\underline{s}, \quad (34)$$

where λ is a user defined parameter that scales the template signal in order to increase or decrease its effect. This difference signal can itself be modelled by the good signal model.

$$\Delta\underline{e} = \underline{e}_x - \lambda\underline{e}_s = A\Delta x \quad (35)$$

This can be expanded into $$\Delta\underline{e} = A_u \cdot \underline{x}_u + A_k \underline{x}_k - \lambda A \underline{s} \quad (36)$$

The Interpolation Model

The diagram in FIG. 18 illustrates how all these models are brought together to create the interpolator. It now remains for us to create a cost function that brigs all these aspects together, and then minimising with respect to the unknown samples $\underline{x}_u$. The cost function we use is $$J = \frac{\mu \cdot J_{xmin} \underline{e}_w^T \underline{e}_w}{J_{wmin}} + \Delta\underline{e}^T \Delta\underline{e} \quad (37)$$

where μ is a user defined parameter that controls how much interpolation is performed in the frequency bands. This equation can be modified by substituting $$\mu' = \frac{\mu \cdot J_{xmin}}{J_{wmin}}$$

$$J = \mu' \underline{e}_w^T \underline{e}_w + \Delta\underline{e}^T \Delta\underline{e}.$$

Minimising this equation with respect to $\underline{x}_u$ leads to the following estimate $\hat{\underline{x}}_u$ for $\underline{x}_u$:

$$\hat{\underline{x}}_u = (A_u^T A_u + \mu' . B_u^T B_u)^{-1} (\mu' . B_u^T B_u \underline{y}_u - A_u^T A_k \underline{x}_k + \lambda A_u^T \underline{e}_s)$$

Background Reference

The following pages show copies of pages 86 to 89, 111, and 114 to 116 of the book 'Digital Audio Restoration" referenced above.

86 4. Parameter Estimation, Model Selection and Classification

The transfer function for this model is $$H(z) = \frac{B(z)}{A(z)}$$

where $B(z)=\Sigma_{j=0}^{Q} b_j z^{-j}$ and $A(z)=1-\Sigma_{i=1}^{P} a_i z^{-i}$.

The model can be seen to consist of applying an IIR filter (see 2.5.1) to the 'excitation' or 'innovation' sequence $\{e_n\}$, which is i.i.d. noise. Generalisations to the model could include the addition of additional deterministic input signals (the ARMAX model [114, 21]) or the inclusion of linear basis functions in the same way as for the general linear model:

$$y=x+G\theta$$

An important special case of the ARMA model is the autoregressive (AR) or 'all-pole' (since the transfer function has poles only) model in which B(z)=1. This model is used considerably throughout the text and is considered in the next section.

4.3 Autoregressive (AR) Modelling

A time series model which is fundamental to much of the work in this book is the autoregressive (AR) model, in which the data is modelled as the output of an all-pole filter excited by white noise. This model formulation is a special case of the innovations representation for a stationary random signal in which the signal $\{X_n\}$ is modelled as the output of a linear time invariant filter driven by white noise. In the AR case the filtering operation is restricted to a weighted sum of past output values and a white noise innovations input $\{e_n\}$:

$$x_n = \sum_{i=1}^{P} a_i x_{n-i} + e_n. \tag{4.41}$$

The coefficients $\{a_i; i=1 \ldots P\}$ are the filter coefficients of the all-pole filter, henceforth referred to as the AR parameters, and P, the number of coefficients, is the order of the AR process. The AR model formulation is closely related to the linear prediction framework used in many fields of signal processing (see e.g. [174, 119]). AR modelling has some very useful properties as will be seen later and these will often lead to simple analytical results where a more general model such as the ARMA model (see previous section) does not. In addition, the AR model has a reasonable basis as a source-filter model for the physical sound production process in many speech and audio signals [156, 187].

4.3 Autoregressive (AR) Modelling 87

4.3.1 Statistical Modelling and Estimation of AR Models

If the probability distribution function $p_e(e_n)$ for the innovation process is known, it is possible to incorporate the AR process into a statistical framework for classification and estimation problems. A straightforward change of variable $I_n$ to $e_n$ gives us the distribution for $I_n$ conditional on the previous P data values as $$p(x_n \mid x_{n-1}, x_{n-2}, \ldots, x_{n-P}) = p_e\left(x_n - \sum_{i=1}^{P} a_i x_{n-i}\right) \tag{4.42}$$

Since the excitation sequence is i.i.d. we can write the joint probability for a contiguous block of N−P data samples $I_{P+1} \ldots I_N$ conditional upon the first P samples $I_1 \ldots I_P$ as $$p(x_{P+1}, x_{P+2}, \ldots, x_N \mid x_1, x_2, \ldots x_P) = \prod_{n=P+1}^{N} p_e\left(x_n - \sum_{i=1}^{P} a_i x_{n-i}\right) \tag{4.43}$$

This is now expressed in matrix-vector notation. The data samples $I_1, \ldots, I_N$ and parameters $a_1, a_2, \ldots, a_{P-1}, a_P$ are written as column vectors of length N and P, respectively $$x=[I_1\, I_2 \ldots I_N]^T,\ a=[a_1\, a_2 \ldots a_{P-1}\, a_P]^T \tag{4.44}$$

x is partitioned into $x_0$, which contains the first P samples $I_1, \ldots, I_P$, and $x_1$ which contains the remaining (N−P) samples $I_{P+1} \ldots I_N$:

$$x_0=[I_1\, I_2 \ldots I_P]^T,\ x_1=[I_{P+1} \ldots I_N]^T \tag{4.45}$$

The AR modelling equation of (4.41) is now rewritten for the block of N data samples as $$x_1=G\,a+e \tag{4.46}$$

where e is the vector of (N−P) excitation values and the ((N−P)×P) matrix G is given by $$G = \begin{bmatrix} x_P & x_{P-1} & \cdots & x_2 & x_1 \\ x_{P+1} & x_P & \cdots & x_3 & x_2 \\ \vdots & & \ddots & & \vdots \\ x_{N-2} & x_{N-3} & \cdots & x_{N-P} & x_{N-P-1} \\ x_{N-1} & x_{N-2} & \cdots & x_{N-P+1} & x_{N-P} \end{bmatrix} \tag{4.47}$$

The conditional probability expression (4.43) now becomes $$p(x_1 | x_0, a)=p_e(x_1-Ga) \tag{4.48}$$

88 4. Parameter Estimation, Model Selection and Classification and in the case of a zero-mean Gaussian excitation we obtain $$p(x_1 \mid x_0, a) = \frac{1}{(2\pi\sigma_e^2)^{\frac{N-P}{2}}} \exp\left(-\frac{1}{2\sigma_e^2}(x_1 - Ga)^T \cdot (x_1 - Ga)\right) \tag{4.49}$$

Note that this introduces a variance parameter $\sigma_e^2$ which is in general unknown. The p.d.f. given is thus implicitly conditional on $\sigma_e^2$ as well as a and $x_0$.

The form of the modelling equation of (4.46) looks identical to that of the general linear parametric model used to illustrate previous sections (4.1). We have to bear in mind, however, that G here depends upon the data values themselves, which is reflected in the conditioning of the distribution of $x_1$ upon $x_0$. It can be argued that this conditioning becomes an insignificant 'end-effect' for N>>P [155] and we can then make an approximation to obtain the likelihood for x:

$$p(x|a) \approx p(x_1|a,x_0),\ N>>P \tag{4.50}$$

How much greater than P N must be will in fact depend upon the pole positions of the AR process. Using this result an approximate ML estimator for a can be obtained by maximisation w.r.t. a, from which we obtain the well-known covariance estimate for the AR parameters, $$a^{Cov}=(G^TG)^{-1}G^Tx_1 \tag{4.51}$$

which is equivalent to a minimisation of the sum-squared prediction error over the block, $E=\Sigma_{i=P+1}^{N} e_i^2$, and has the same form as the ML parameter estimate in the general linear model.

Consider now an alternative form for the vector model equation (4.46) which will be used in subsequent work for Bayesian detection of clicks and interpolation of AR data:

$$e=Ax \tag{4.52}$$

where A is the ((N−P)×(N)) matrix defined as $$A=\begin{bmatrix} -a_P & \cdots & -a_1 & 1 & 0 & 0 & \cdots & 0 & 0 \\ 0 & -a_P & \cdots & -a_1 & 1 & 0 & 0 & \cdots & 0 \\ \vdots & \vdots & \ddots & \ddots & \ddots & \ddots & \ddots & \vdots & \vdots \\ \cdots & 0 & 0 & -a_P & \cdots & -a_1 & 1 & 0 & 0 \\ 0 & \cdots & 0 & 0 & -a_P & \cdots & -a_1 & 1 & 0 \\ 0 & 0 & \cdots & 0 & 0 & -a_P & \cdots & -a_1 & 1 \end{bmatrix} \quad (4.53)$$

The conditional likelihood for white Gaussian excitation is then rewritten as:

$$p(x_1\mid x_0,a)=\frac{1}{(2\pi\sigma_e^2)^{\frac{N-P}{2}}}\exp\left(-\frac{1}{2\sigma_e^2}x^TA^TAx\right) \quad (4.54)$$

4.3 Autoregressive (AR) Modelling 89

In order to obtain the exact (i.e. not conditional upon $x_0$) likelihood we need the distribution $p(x_0|a)$, since $$p(x|a)=p(x_1|x_0,a)p(x_0|a)$$

In appendix C this additional term is derived, and the exact likelihood for all elements of x is shown to require only a simple modification to the conditional likelihood, giving:

$$p(x\mid a)=\frac{1}{(2\pi\sigma_e^2)^{\frac{N}{2}}|M_{x_0}|^{1/2}}\exp\left(-\frac{1}{2\sigma_e^2}x^TM_x^{-1}x\right) \quad (4.55)$$

where $$M_x^{-1}=A^TA+\begin{bmatrix} M_{x_0}^{-1} & 0 \\ 0 & 0 \end{bmatrix} \quad (4.56)$$

and $M_{x_0}$ is the autocovariance matrix for P samples of data drawn from AR process a with unit variance excitation. Note that this result relies on the assumption of a stable AR process. As seen in the appendix, $M_{x_0}^{-1}$ is straightforwardly obtained in terms of the AR coefficients for any given stable AR model a. In problems where the AR parameters are known beforehand but certain data elements are unknown or missing, as in click removal or interpolation problems, it is thus simple to incorporate the true likelihood function in calculations. In practice it will often not be necessary to use the exact likelihood since it will be reasonable to fix at least P 'known' data samples at the start of any data block. In this case the the conditional likelihood. (4.54) is the required quantity. Where P samples cannot be fixed it will be necessary to use the exact likelihood expression (4.55) as the conditional likelihood will perform, badly in estimating missing data points within $x_0$.

While the exact likelihood is quite easy to incorporate in missing data or interpolation problems with known a, it is much more difficult to use for AR parameter estimation since the functions to maximise are non-linear in the parameters a. Hence the linearising approximation of equation (4.50) will usually be adopted for the likelihood when the parameters are unknown.

In this section we have shown how to calculate exact and approximate likelihoods for AR data, in two different forms: one as a quadratic form in the data x and another as a quadratic (or approximately quadratic) form in the parameters a. This likelihood will appear on many subsequent occasions throughout the book.

5.2 Interpolation of Missing Samples 111

5.2.3.1 Pitch-Based Extension to the AR Interpolator

Vaseghi and Rayner [191] propose an extended AR model to take account of signals with long-term correlation structure, such as voiced speech, singing or near-periodic music. The model, which is similar to the long term pre diction schemes used in some speech coders, introduces extra predictor parameters around the pitch period T, so that the AR model equation is modified to:

$$x_t=\sum_{i=1}^{P}x_{n-i}a_i+\sum_{j=-Q}^{Q}x_{n-T-j}b_j+e_t, \quad (5.16)$$

where Q is typically smaller than P. Least squares/ML interpolation using this model is of a similar form to the standard LSAR interpolator, and parameter estimation is straightforwardly derived as an extension of standard AR parameter estimation methods (see section 4.3.1). The method gives a useful extra degree of support from adjacent pitch periods which can only be obtained using very high model orders in the standard AR case. As a result, the 'under-prediction' sometimes observed when interpolating long gaps is improved. Of course, an estimate of T is required, but results are quite robust to errors in this. Veldhuis [192, chapter 4] presents a special case of this interpolation method in which the signal is modelled by one single 'prediction' element at the pitch period (i.e. Q=0 and P=0 in the above equation).

5.2.3.2 Interpolation with an AR+Basis Function Representation

A simple extension of the AR-based interpolator modifies the signal model to include some deterministic basis functions, such as sinusoids or wavelets. Often it will be possible to model most of the signal energy using the deterministic basis, while the AR model captures the correlation structure of the residual. The sinusoid+residual model, for example, has been applied successfully by various researchers, see e.g. [169, 158, 165, 66]. The model for $I_n$ with AR residual can be written as:

$$x_n=\sum_{i=1}^{Q}c_i\psi_i[n]+r_n \quad \text{where} \quad r_n=\sum_{i=1}^{P}a_ir_{n-i}+e_n$$

Here $\phi_i[n]$ is the nth element of the ith basis vector $\phi_i$ and $r_n$ is the residual, which is modelled as an AR process in the usual way. For example, with a sinusoidal basis we might take $\phi_{2i-1}[n]=\cos(w_inT)$ and $\phi_{2i}[n]=\sin(w_inT)$, where $w_i$ is the ith sinusoid frequency. Another simple example of basis functions would be a d.c. offset or polynomial trend. These can be incorporated within exactly the same model and hence the interpolator presented here is a means for dealing also with non-zero mean or smooth underlying trends.

114 5. Removal of Clicks

If we assume for the moment that the set of basis vectors $\{\phi_i\}$ is fixed and known for a particular data vector x then the LSAR interpolator can easily be extended to cover this case. The unknowns are now augmented by the basis coefficients, $\{c_i\}$. Define c as a column vector containing the $c_i$'s and a (N×Q) matrix G such that x=Gc+r, where r is the vector of residual samples. The columns of G are the basis vectors, i.e. $G=[\phi_1 \ldots \phi_Q]$. The excitation sequence can then be written in terms of x and c as e=A(x−Gc), which is the same form as for the general linear model (see section 4.1).As before the solution can easily be obtained from least squares, ML and MAP criteria, and the solutions will be equivalent in most cases. We consider here the least squares solution which minimises $e^T e$ as before, but this time with respect to both $x_{(i)}$ and c, leading to the following estimate:

$$\begin{bmatrix} x_{(1)} \\ c \end{bmatrix} = \begin{bmatrix} A_{(i)}^T A_{(i)} & -A_{(i)}^T A G \\ -G^T A^T A_{(i)} & G^T A^T A G \end{bmatrix}^{-1} \begin{bmatrix} -A_{(i)}^T A_{-(i)} x_{-(i)} \\ G^T A^T A_{-(i)} x_{-(i)} \end{bmatrix} \tag{5.17}$$

This extended version of the interpolator reduces to the standard interpolator when the number of basis vectors, Q, is equal to zero. If we back-substitute for c in (5.17), the following expression is obtained for $x_{(i)}$ 5.2 Interpolation of Missing Samples 115 alone:

$$x_{(i)} = -(A_{(i)}^T (I - AG(G^T A^T A G)^{-1} G^T A^T) A_{(i)})^{-1}$$

$$(A_{(i)}^T A_{-(i)} x_{-(i)} - A_{(i)} A G (G^T A^T A G)^{-1} G^T A^T A_{-(i)} x_{-(i)})$$

These two representations are equivalent to both the maximum likelihood (ML) and maximum a posteriori (MAP)[1] interpolator under the same conditions as the standard AR interpolator, i.e. that no missing samples occur in the first P samples of the data vector. In cases where missing data does occur in the first P samples, a similar adaptation to the algorithm can be made as for the pure AR case. The modified interpolator involves some extra computation in estimating the basis coefficients, but as for the pure AR case many of the terms can be efficiently calculated by utilising the banded structure of the matrix A.

[1] assuming a uniform prior distribution for the basis coefficients

We do not address the issue of basis function selection here. Multiscale and 'elementary waveform' representations such as wavelet bases may capture the non-stationary nature of audio signals, while a sinusoidal basis is likely to capture the character of voiced speech and the steady-state section of musical notes. Some combination of the two may well provide a good match to general audio. Procedures have been devised for selection of the number and frequency of sinusoidal basis vectors in the speech and audio literature [127, 45, 66] which involve various peak tracking and selection strategies in the discrete Fourier domain. More sophisticated and certainly more computationally intensive methods might adopt a time domain model selection strategy for selection of appropriate basis functions from some large 'pool' of candidates. A Bayesian approach would be a strong possibility for this task, employing some of the powerful Monte Carlo variable selection methods which are now available [65, 108]. Similar issues of iterative AR parameter estimation apply as for the standard AR interpolator in the AR plus basis function interpolation scheme.

5.2.3.2.1 Example: Sinusoid+AR Residual Interpolation

As a simple example of how the inclusion of deterministic basis vectors can help in restoration performance we consider the interpolation of a short section of brass music, which has a strongly 'voiced' character, see FIG. 5.2. FIG. 5.3 shows the same data with three missing sections, each of length 100 samples. This was used as the initialisation for the interpolation algorithm. Firstly a sinusoid+AR interpolation was applied, using 25 sinusoidal basis frequencies and an AR residual with order P=15. The algorithm used was iterative, re-estimating the AR parameters, sinusoidal frequencies and missing data points at each step. The sinusoidal frequencies 116 5. Removal of Clicks are estimated rather crudely at each step by simply selecting the 25 frequencies in the DFT of the interpolated data which have largest magnitude. The number of iterations was 5. FIG. 5.4 shows the resulting interpolated data, which can be seen to be a very effective reconstruction of the original uncorrupted data. Compare this with interpolation using an AR model of order 40 (chosen to match the 25+15 parameters of the sin+AR interpolation), as shown in FIG. 5.5, in which the data is under-predicted quite severely over the missing sections. Finally, a zoomed-in comparison of the two methods over a short section of the same data is given in FIG. 5.6, showing more clearly the way in which the AR interpolator under-performs compared with the sin+AR interpolator.

5.2.3.3 Random Sampling Methods

A further modification to the LSAR method is concerned with the characteristics of the excitation signal. We notice that the LSAR procedure seeks to minimise the excitation energy of the signal, irrespective of its time domain autocorrelation. This is quite correct, and desirable mathematical properties result. However, FIG. 5.8 shows that the resulting excitation signal corresponding to the corrupted region can be correlated and well below the level of surrounding excitation. As a result, the 'most probable' interpolants may under-predict the true signal levels and be over-smooth compared with the surrounding signal. In other words, ML/MAP procedures do not necessarily generate interpolants which are typical for the underlying model, which is an important factor in the perceived effect of the restoration. Rayner and Godsill [161] have devised a method which addresses this problem. Instead of minimising the excitation energy, we consider interpolants with constant excitation energy. The excitation energy may be expressed as:

$$E = (x_{(i)} - x_{(i)}^{LS})^T A_{(i)}^T A_{(i)} (x_{(i)} - x_{(i)}^{LS}) + E_{LS},\ E > E_{LS}, \tag{5.18}$$

where $E_{LS}$ is the excitation energy corresponding to the LSAR estimate $x_{(i)}^{LS}$. The positive definite matrix $A_{(i)}^T A_{(i)}$ can be factorised into 'square roots' by Cholesky or any other suitable matrix decomposition [86] to give $A_{(i)}^T A_{(i)} = M^T M$, where M is a non-singular square matrix. A transformation of variables $u = M(x_{(i)} - x_{(i)}^{LS})$ then serves to de-correlate the missing data samples, simplifying equation (5.18) to:

$$E = u^T u + E_{LS}, \tag{5.19}$$

from which it can be seen that the (non-unique) solutions with constant excitation energy correspond to vectors u with constant $L_2$-norm. The resulting interpolant can be obtained by the inverse transformation $x_{(i)} = M^{-1} u + x_{(i)}^{LS}$.

The invention claimed is:

1. A method for attenuation or removal of an unwanted sound from a recorded audio signal comprising the steps of:

displaying a spectrogram representing the recorded audio signal for viewing by an operator;

the operator viewing the spectrogram and graphically selecting a region on the spectrogram display to select a portion of the recorded audio signal, the selected portion of the recorded audio signal being constrained in time and frequency, the selected portion of the recorded audio signal containing the unwanted sound and being surrounded on the spectrogram by a desired portion of the recorded audio signal;

interpolating an estimate for the recorded audio signal within the selected region on the spectrogram; and replacing the selected portion of the recorded audio signal with the estimate such that the unwanted sound is attenuated or removed while the audio signal outside the selected region is not adversely affected.

2. The method according to claim 1, in which the selected portion of the recorded audio signal is constrained between two selected times.

3. The method according to claim 1, in which the selected portion of the recorded audio signal is constrained in a frequency band between two selected frequencies.

4. The method according to claim 1, comprising selecting one or more constrained portions or regions, each being defined in terms of an upper and a lower time bound and an upper and a lower frequency bound, the bounds being independently adjustable so as to define a portion or region of the recorded audio signal that contains at least part of the unwanted sound.

5. The method according to claim 1, characterised by the use of band pass filtering to split the signal into two or more signals representing the signal inside the frequency constraint(s) or band(s) and the signal outside the frequency band(s), interpolating one or more of these band passed signals, and recombining the band passed signals so as to form an interpolated estimate of the original spectrum inside the selected band(s).

6. The method according to claim 5, characterised by the interpolated signal being constrained to converge to the chosen template signal within the selected constraint(s).

7. The method according to claim 6, characterised by the template signal having the same power spectrum as the surrounding signal, thereby preventing inappropriate power loss in the interpolated data.

8. The method according to claim 1, characterised by the simultaneous interpolation of two or more discrete frequency constraints or bands, and/or two or more discrete regions bounded by time constraints.

9. The method according to claim 1, in which the interpolated signal affects the signal spectrum inside the selected constraint(s) without adversely affecting the signal spectrum that lies outside the selected constraints(s).

10. The method according to claim 1, in which the interpolated signal affects the signal spectrum that lies outside the selected constraint(s).

11. The method according to claim 1, comprising the step of simultaneously interpolating two or more discrete frequency bands.

12. The method according to claim 1, wherein the recorded audio signal is a recorded digital audio signal.

13. The method according to claim 12, in which the spectrogram is used to define the frequency constraint or constraints and to define a set of samples to be interpolated.

14. The method according to claim 12, in which mathematical techniques are used to interpolate an estimate for a set of samples in the selected portion of the recorded audio signal from the surrounding samples, the or each frequency constraint or band being used to constrain the interpolation of the set of samples such that the interpolated signal affects the signal spectrum inside the selected frequency constraint(s), and preferably does not adversely affect the signal spectrum that lies outside the selected frequency constraint(s).

15. The method according to claim 12, wherein the set of samples within the selected portion or portions of the recorded audio signal is assumed to be corrupted by a disturbance which is modelled by a model, in which the model is used to constrain the interpolation of the set of samples such that the interpolated signal affects the signal spectrum inside the selected constraint(s).

16. The method according to claim 15, in which the model is an autoregressive (AR) model.

17. The method according to claim 16, wherein the signal is modelled by an AR model characterised by the interaction of the signal model and the disturbance model being used to constrain the interpolation of the set of samples such that the interpolated signal affects the signal spectrum inside the selected constraint(s).

18. The method according to claim 12, in which an AR model is used to interpolate an estimate for a set of samples in a signal from the surrounding samples, characterised by applying a modification to excitation signal equations that makes the interpolated signal converge to a chosen template signal.

19. A method according to claim 1, further comprising:

the operator using the spectrogram to select at least one additional portion of the recorded audio signal, each of the at least one additional selected portion of the recorded audio signal being constrained in time and frequency, each of the at least one additional selected portion of the recorded audio signal containing a respective unwanted sound and being surrounded by a desired portion of the recorded audio signal; and interpolating a corresponding at least one additional estimate for the recorded audio signal within the corresponding at least one additional selected portion of the recorded audio signal to attenuate or remove unwanted sound.

20. The method according to claim 1, further comprising the operator selecting at least one additional region on the spectrogram display to select a corresponding at least one additional portion of the recorded audio signal, each of the at least one additional portion of the recorded audio signal containing a respective unwanted sound of a corresponding at least one additional unwanted sound and being surrounded on the spectrogram by the desired portion of the recorded audio signal.

21. The method according to claim 1, wherein one or more of the at least one additional unwanted sound is a harmonic of the unwanted sound.

22. The method according to claim 1, wherein the selected portion of the recorded audio signal as shown on the spectrogram is in the form of a rectangle surrounding the unwanted sound in the spectrogram.

23. The method according to claim 1, wherein the selected portion of the recorded audio signal as shown on the spectrogram is in the form of a non-rectangular shape surrounding the unwanted sound in the spectrogram.

24. The method according to claim 1, further comprising the operator selecting an additional region on the spectrogram display to define a set of samples for use to derive a signal model for use in interpolating the estimate for the recorded audio signal within the selected region on the spectrogram.

25. The method according to claim 1, further comprising redisplaying the spectrogram after the unwanted sound has been attenuated or removed so that the operator can see the effect of the interpolation.

26. A method for attenuation or removal of an unwanted sound from a digitally recorded audio signal, comprising:

displaying a spectrogram representing a digitally recorded audio signal for viewing by an operator;

the operator viewing the spectrogram and the operator selecting a region on the spectrogram display to select a portion of the digitally recorded audio signal, the selected portion of the digitally recorded audio signal being constrained in time and being constrained in frequency, the selected portion of the digitally recorded audio signal containing the unwanted sound and being surrounded on the spectrogram by a desired portion of the digitally recorded audio signal;

interpolating an estimate for the digitally recorded audio signal within the selected region on the spectrogram; and replacing the selected portion of the digitally recorded audio signal with the estimate such that the unwanted sound is attenuated or removed while the desired portion of the digitally recorded audio signal is not adversely affected.

* * * * *

UNITED STATES PATENT AND TRADEMARK OFFICE

CERTIFICATE OF CORRECTION

PATENT NO. : 7,978,862 B2
APPLICATION NO. : 10/503204
DATED : July 12, 2011
INVENTOR(S) : David Anthony Betts It is certified that error appears in the above-identified patent and that said Letters Patent is hereby corrected as shown below:

Column 1,
Line 47, "infrequency" should read --in frequency--.

Column 6,
Line 27, "Bach of these" should read --Each of these--.

Column 7,
Line 54, "sequence hat" should read --sequence that--.

Column 9,
Line 14, "$r_{ww}(\tau) = E\{w'(t)w'(t - \tau)\}$" should read --$r_{ww}(\tau) = E\{w'(t).w'(t - \tau)\}$--.
Line 16, "$W'(\bar{w})$" should read --W'(w)--.
Line 53, "with al" should read --with an--.
Line 65, "$\underline{w}_k=0$" should read --$\underline{w}_k=\underline{0}$--.

Column 10,
Line 15, "$\Delta\underline{x}=\underline{x}-\Delta\underline{s}$," should read --$\Delta\underline{x}=\underline{x}-\lambda\underline{s}$,--.
Line 28, "that brigs all" should read --that brings all--.

Column 11,
Line 44, "variable $I_n$" should read --variable $x_n$--.
Line 45, "for $I_n$ conditional" should read --for $x_n$ conditional--.
Line 55, "$I_{p+1}...I_N$ conditional" should read --$x_{P+1}...x_N$ conditional--.
Line 55, "samples $I_1...I_P$" should read --samples $x_1...x_P$--.
Line 64, "samples $I_1,...,I_N$" should read --samples $x_1,...,x_N$--.
Line 65, "respectively" should read --respectively:--.
Line 67, "$x = [I_1I_2...I_N]^T$" should read --$x = [x_1x_2...x_N]^T$ --.

Signed and Sealed this
Sixth Day of March, 2012

David J. Kappos
*Director of the United States Patent and Trademark Office*

Column 12,
Line 2, "$I_1,\ldots,I_P$," should read --$x_1,\ldots,x_P$,--.
Line 3, "$I_{P+1}\ldots I_N$:" should read --$x_{P+1}\ldots x_N$:--.
Line 5, "$x_0=[I_1 I_2\ldots I_P]^T$, $x_1=[I_{P+1}\ldots I_N]^T$" should read --$x_0=[x_1 x_2\ldots x_P]^T$, $x_1=[x_{p+1}\ldots x_N]^T$--.

Column 14,
Line 39, "for $I_n$" should read --for $x_n$--.
Line 47, "Here $\varphi_i[n]$" should read --Here $\psi_i[n]$--.
Line 47, "vector $\varphi_i$" should read --vector $\psi_i$--.
Line 57, "$\{\varphi_i\}$ is fixed" should read --$\{\psi_i\}$ is fixed--.
Line 63, "$G=[\varphi_1\ldots \varphi_Q$" should read --$G=[\psi_1\ldots \psi_Q]$--.

Column 15,
Line 14, "5.2 Interpolation of Missing Samples 115" should be removed.
Line 61, "116 5. Removal of Clicks" should be removed.